US012443611B2

(12) United States Patent
Francis John Benedict et al.

(10) Patent No.: US 12,443,611 B2
(45) Date of Patent: Oct. 14, 2025

(54) SYSTEMS AND METHODS FOR AUTOMATED ELECTRONICS DESIGN AND GRAPHICAL USER INTERFACE

(71) Applicant: CELUS GmbH, Munich (DE)

(72) Inventors: Anthony Manojh Francis John Benedict, Munich (DE); André Pesco Alcalde, Munich (DE); Alexander Pohl, Heldenstein (DE)

(73) Assignee: CELUS GmbH, Munich (DE)

( * ) Notice: Subject to any disclaimer, the term of this patent is extended or adjusted under 35 U.S.C. 154(b) by 150 days.

(21) Appl. No.: 18/449,549

(22) Filed: Aug. 14, 2023

(65) Prior Publication Data
US 2024/0054140 A1 Feb. 15, 2024

Related U.S. Application Data

(60) Provisional application No. 63/371,500, filed on Aug. 15, 2022.

(51) Int. Cl.
*G06F 16/2457* (2019.01)
*G06F 30/31* (2020.01)

(52) U.S. Cl.
CPC ........ *G06F 16/24578* (2019.01); *G06F 30/31* (2020.01)

(58) Field of Classification Search
CPC ............................ G06F 16/24578; G06F 30/31
See application file for complete search history.

(56) References Cited

U.S. PATENT DOCUMENTS

| | | | |
|---|---|---|---|
| 5,867,397 A * | 2/1999 | Koza | G06N 3/126 703/2 |
| 8,839,184 B1 * | 9/2014 | Seguine | G06F 30/3947 716/139 |
| 9,201,994 B1 * | 12/2015 | Tripathi | G06F 30/30 |
| 9,268,895 B2 * | 2/2016 | Perry | G06F 30/20 |
| 9,569,574 B1 * | 2/2017 | Khan | G06F 30/394 |
| 9,990,455 B1 | 6/2018 | Sinivaara et al. | |
| 10,102,320 B2 * | 10/2018 | Pataky | G06F 30/327 |
| 10,275,542 B2 * | 4/2019 | Ruehl | G06F 9/455 |
| 10,289,788 B1 | 5/2019 | Kumar et al. | |
| 10,354,037 B1 * | 7/2019 | Ginetti | G06F 30/398 |
| 10,423,884 B2 * | 9/2019 | Hyde | G06N 7/01 |
| 10,437,954 B1 | 10/2019 | White et al. | |
| 10,558,774 B1 | 2/2020 | Kumar et al. | |
| 10,592,704 B2 | 3/2020 | Brookshire | |
| 10,678,973 B2 | 6/2020 | Chuang et al. | |
| 10,699,051 B1 | 6/2020 | Zhang et al. | |
| 10,719,657 B1 | 7/2020 | Feuillette | |
| 10,769,328 B2 | 9/2020 | Chawda et al. | |
| 10,783,312 B1 * | 9/2020 | Ginetti | G06F 30/398 |
| 10,817,634 B2 | 10/2020 | Oh | |
| 11,087,060 B1 | 8/2021 | Zhang et al. | |
| 11,216,605 B2 | 1/2022 | Osburn et al. | |

(Continued)

*Primary Examiner* — Mark E Hershley
(74) *Attorney, Agent, or Firm* — Knobbe Martens Olson & Bear LLP

(57) ABSTRACT

System and methods are provided for automated system design. The system receives input requirements and applies an algorithm to automatically identify hardware components that satisfy the requirements. The recommended components are presented in a graphical user interface. If there are no hardware components to satisfy the design, then the system presents error messages.

19 Claims, 22 Drawing Sheets

(56) References Cited

U.S. PATENT DOCUMENTS

| | | | |
|---|---|---|---|
| 11,366,948 B2 | 6/2022 | Srinivasan et al. | |
| 11,775,720 B2 | 10/2023 | Mahmud et al. | |
| 11,790,136 B2 | 10/2023 | Park et al. | |
| 11,836,602 B2 | 12/2023 | Li | |
| 11,836,641 B2 * | 12/2023 | Mamidi | G06F 30/398 |
| 11,900,033 B2 * | 2/2024 | Hunter | G06F 30/31 |
| 2005/0027491 A1 * | 2/2005 | Fertner | G06F 30/367 |
| | | | 702/196 |
| 2009/0282379 A1 * | 11/2009 | Singh | G06F 30/30 |
| | | | 716/110 |
| 2009/0313596 A1 * | 12/2009 | Lippmann | G06F 30/327 |
| | | | 716/126 |
| 2010/0095262 A1 * | 4/2010 | Garg | G06F 30/394 |
| | | | 716/103 |
| 2013/0298100 A1 * | 11/2013 | Hastings | G06F 30/00 |
| | | | 716/126 |
| 2015/0039283 A1 * | 2/2015 | Ruehl | G06F 9/455 |
| | | | 703/13 |
| 2019/0108293 A1 * | 4/2019 | Morton | G06F 30/327 |
| 2020/0097617 A1 * | 3/2020 | Zhilinsky | G06T 11/00 |
| 2021/0319327 A1 * | 10/2021 | Poirier | G06V 30/18067 |
| 2022/0027536 A1 | 1/2022 | Dutta et al. | |
| 2022/0180159 A1 * | 6/2022 | Kimura | G06F 30/39 |
| 2022/0374288 A1 * | 11/2022 | Kibardin | G06N 3/084 |
| 2023/0153505 A1 | 5/2023 | Chang et al. | |
| 2023/0153512 A1 | 5/2023 | Shapira et al. | |
| 2023/0385503 A1 * | 11/2023 | Lvov | G06F 30/392 |
| 2024/0054140 A1 * | 2/2024 | Francis John Benedict | G06F 30/31 |
| 2024/0126960 A1 | 4/2024 | Peng et al. | |

\* cited by examiner

SYSTEMS AND METHODS FOR AUTOMATED ELECTRONICS DESIGN AND GRAPHICAL USER INTERFACE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims benefit of U.S. Provisional Patent Application Ser. No. 63/371,500, entitled "SYSTEMS AND METHODS FOR AUTOMATED ELECTRONICS DESIGN AND GRAPHICAL USER INTERFACE" filed Aug. 15, 2022, which is hereby incorporated by reference in its entirety.

BACKGROUND

Electronics engineering is a technical process to design and develop electronic equipment. The technical process includes designing electronic hardware systems based on electronic components. Each component can be represented by a system of elements using abstract symbols, which can be stored in schematic files. A schematic file can include a "network" or a "net," which is a collection of two or more interconnected subcomponents. A group of nets from a schematic file can be a port. Some schematic files can have thousands of nets. Ports of electronic components must be taken into consideration when designing electronic hardware systems. Some existing Engineering Design Automation tools require manual configuration of physical connections between electronic components.

SUMMARY

The systems, methods, and devices described herein each have several aspects, no single one of which is solely responsible for its desirable attributes. Without limiting the scope of this disclosure, several non-limiting features will now be discussed briefly.

According to an embodiment, a computer-implemented method for automated electronics design is disclosed comprising: receiving a first block, a second block, a first connection, and a second connection, wherein the first connection connects the first block and the second block, wherein the second connection connects to at least one of the first block and the second block; determining query parameters based on the first block and the second block; querying a database with the query parameters; receiving, from the database, a plurality of results responsive to the query parameters, wherein each result of the plurality of results is associated with a hardware component; identifying, from the plurality of results, a first subset of hardware components with a first compatible port for the first connection, the first block, and the second block; assigning an unavailability label to a first compatible port for each hardware component from the first subset of hardware components; identifying, from the first subset, a second subset of hardware components with a second compatible port for the second connection and at least one of the first block and the second block; determining a ranking for the second subset of hardware components; and selecting, from the second subset, a first hardware component and a second hardware component based on the ranking.

In another embodiment, the first connection may not have an assigned port type, and the computer-implemented method may further comprise: determining, from the plurality of results, a first set of results with a first category type matching a category type of the first block; determining, from the plurality of results, a second set of results with a second category type matching a category type of the second block; identifying a common port type between at least one hardware component from the first set and one hardware component from the second set; and assigning the common port type to the first connection between the first block and the second block.

In another embodiment, identifying the first subset of hardware components may further comprise: determining, from the plurality of results, a first ranking of results with a first category type compatible with a category type of the first block; and selecting, from the plurality of results, a first set of results under a threshold number of results based on the ranking.

In another embodiment, identifying the first subset of hardware components may further comprise: determining that the first set of results do not have the first compatible port for the first connection, the first block, and the second block; selecting, from the plurality of results, a second set of results different from the first set and with a second category type compatible with the category type of the first block; determining that a hardware component from the second set of results has the first compatible port for the first connection, the first block, and the second block; and including, in the first subset of hardware components, the hardware component from the second set.

In another embodiment, the computer-implemented method may further comprise: presenting, in a graphical user interface, a visual indicator that a port type has been assigned to the first connection between the first block and the second block.

In another embodiment, determining the query parameters based on the first block may further comprise: converting a specification for the first block to a first query parameter, wherein the specification comprises an attribute and attribute value; and adding the first query parameter to the query parameters.

In another embodiment, determining the ranking for the second subset of hardware components may further comprise: sorting, each hardware component from the second subset of hardware components, based on at least one of cost, quality, area, or component availability.

In another embodiment, the computer-implemented method may further comprise: presenting, in a graphical user interface, a visual indicator that at least one of the first hardware component or the second hardware component has been selected.

In another embodiment, the computer-implemented method may further comprise: determining a plurality of hardware components compatible with the first block based on the ranking, wherein the plurality of hardware components comprise the first hardware component; and presenting, in a graphical user interface, the plurality of hardware components.

In another embodiment, identifying the first subset of hardware components may further comprise: determining, from the plurality of results, a first ranking of results with a first category type matching a category type of the first block; and selecting, from the plurality of results, a first set of results under a threshold number of results based on the ranking.

According to an embodiment, a system is disclosed comprising: a data storage medium comprising a database, wherein the database comprises a plurality of hardware components, wherein each hardware component of the plurality of hardware components comprises one or more ports; and one or more computer hardware processors in communication with the data storage medium, wherein the one or more computer hardware processors are configured to execute computer-executable instructions to at least: receive a first block, a second block, a first connection, and a second connection, wherein the first connection connects the first block and the second block, wherein the second connection connects to at least one of the first block and the second block; determine query parameters based on the first block and the second block; query the database with the query parameters; receive, from the database, a plurality of results responsive to the query parameters, wherein each result of the plurality of results is associated with a hardware component; identify, from the plurality of results, a first subset of hardware components with a first compatible port for the first connection, the first block, and the second block; assign an unavailability label to the first compatible port for each hardware component from the first subset of hardware components; identify, from the first subset, a second subset of hardware components with a second compatible port for the second connection and at least one of the first block and the second block; determine a ranking for the second subset of hardware components; and select, from the second subset, a first hardware component and a second hardware component based on the ranking.

In another embodiment, identifying the first subset of hardware components may further comprise: determining, from the plurality of results, a first ranking of results with a first category type compatible with a category type of the first block; selecting, from the plurality of results, a first set of results under a threshold number of results based on the ranking; determining that the first set of results do not have the first compatible port for the first connection, the first block, and the second block; selecting, from the plurality of results, a second set of results different from the first set and with a second category type compatible with a first category type of the first block; determining that a hardware component from the second set of results has the first compatible port for the first connection, the first block, and the second block; and including, in the first subset of hardware components, the hardware component from the second set.

In another embodiment, the one or more computer hardware processors may be configured to execute additional computer-executable instructions to at least: determine, from the plurality of results, a first set of results with a first category type compatible with a category type of the first block; determine, from the plurality of results, a second set of results with a second category type compatible with a category type of the second block; and identify the first compatible port between at least one hardware component from the first set and one hardware component from the second set according to a port compatibility map.

In another embodiment, the first connection may not have an assigned port type, and the one or more computer hardware processors may be configured to execute additional computer-executable instructions to at least: determine, from the plurality of results, a first set of results with a first category type compatible with a category type of the first block; determine, from the plurality of results, a second set of results with a second category type compatible with a category type of the second block; and identify the first compatible port between at least one hardware component from the first set and one hardware component from the second set.

In another embodiment, determining the query parameters based on the first block may further comprise: converting a specification for the first block to a first query parameter, wherein the specification comprises an attribute and attribute value; and adding the first query parameter to the query parameters.

In another embodiment, the one or more computer hardware processors may be configured to execute additional computer-executable instructions to at least: determine a mapping of a plurality of nets to a plurality of signals for the first hardware component; and determine, from the mapping of the plurality of nets to the plurality of signals, a set pairing for the plurality of nets to the plurality of signals compatible with the first connection, the first block, and the second block.

In another embodiment, determining the set pairing may further comprise: applying an Edmonds-Karp algorithm to a graph representation of the mapping of the plurality of nets to the plurality of signals.

In another embodiment, the unavailability label may be assigned to the first compatible port at a first time, and the one or more computer hardware processors may be configured to execute additional computer-executable instructions to at least: determine a mapping of a plurality of nets to a plurality of signals for the first hardware component; determine, from the mapping of the plurality of nets to the plurality of signals, that a set pairing does not exist for the plurality of nets to the plurality of signals compatible with the first connection, the first block, and the second block; remove the unavailability label for the first compatible port at a second time; and resolve the first block, a second block, a first connection, and a second connection after the second time.

According to an embodiment, a system is disclosed comprising: a data storage medium; and one or more computer hardware processors in communication with the data storage medium, wherein the one or more computer hardware processors are configured to execute computer-executable instructions to at least: receive, via a graphical user interface, a selection of a first block, a second block, and a first connection between the first block and the second block; determine a plurality of hardware components for the first block and the second block; select, from the plurality of hardware components, (i) a first hardware component with a first compatible port and (ii) a second hardware component with a second compatible port; and present, in the graphical user interface, a port type associated with the first compatible port, the first hardware component, and the second hardware component.

In another embodiment, selecting the first compatible port may further comprise: determining a first set of results with a first category type compatible with a category type of the first block; determining a second set of results with a second category type compatible with a category type of the second block; and identifying the first compatible port and the second compatible port between at least one hardware component from the first set and one hardware component from the second set according to a port compatibility map.

In another embodiment, the first port type of the first compatible port may be different from a second port type of the second compatible port.

In another embodiment, determining the plurality of hardware components for the first block and the second block may further comprise: determining query parameters based on the first block and the second block; querying a database with the query parameters; and receiving, from the database, the plurality of hardware components responsive to the query parameters.

In another embodiment, the one or more computer hardware processors may be configured to execute additional computer-executable instructions to at least: determine a mapping of a plurality of nets to a plurality of signals for the first hardware component; and determine, from the mapping of the plurality of nets to the plurality of signals, a set pairing for the plurality of nets to the plurality of signals compatible with the first connection, the first block, and the second block.

In another embodiment, determining the set pairing may further comprise: applying a greedy algorithm to a graph representation of the mapping of the plurality of nets to the plurality of signals.

In another embodiment, the one or more computer hardware processors may be configured to execute additional computer-executable instructions to at least: receive, via the graphical user interface, a selection of a third block and a second connection between the first block and the third block; receive, via the graphical user interface, a specification for the third block; determine that a hardware component does not exist in the plurality of hardware components with a category type of the third block compatible with the specification; and present, in the graphical user interface, an indicator of an error associated with the third block.

In another embodiment, receiving the specification for the third block may further comprise: receiving, via the graphical user interface, an attribute, an operator, and an attribute value, wherein the specification comprises the attribute, the operator, and the attribute value.

In another embodiment, the one or more computer hardware processors may be configured to execute further computer-executable instructions to at least: receive, via the graphical user interface, a selection of a third block and a second connection between the first block and the third block; receive, via the graphical user interface, a selection of a first port type for the second connection; determine that a hardware component does not exist in the plurality of hardware components with a category type of the third block and the first port type; and present, in the graphical user interface, an indicator of an error associated with the second connection.

In another embodiment, the matching port type may be a first port type, wherein the one or more computer hardware processors may be configured to execute further computer-executable instructions to at least: receive, via the graphical user interface, a selection of a third block and a second connection between the first block and the third block; receive, via the graphical user interface, a selection of the first port type for the second connection; determine that a hardware component does not exist in the plurality of hardware components with a category type of the first block and with at least two ports of the first port type; and present, in the graphical user interface, an indicator of an error associated with the second connection.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

DETAILED DESCRIPTION

Figure 1:
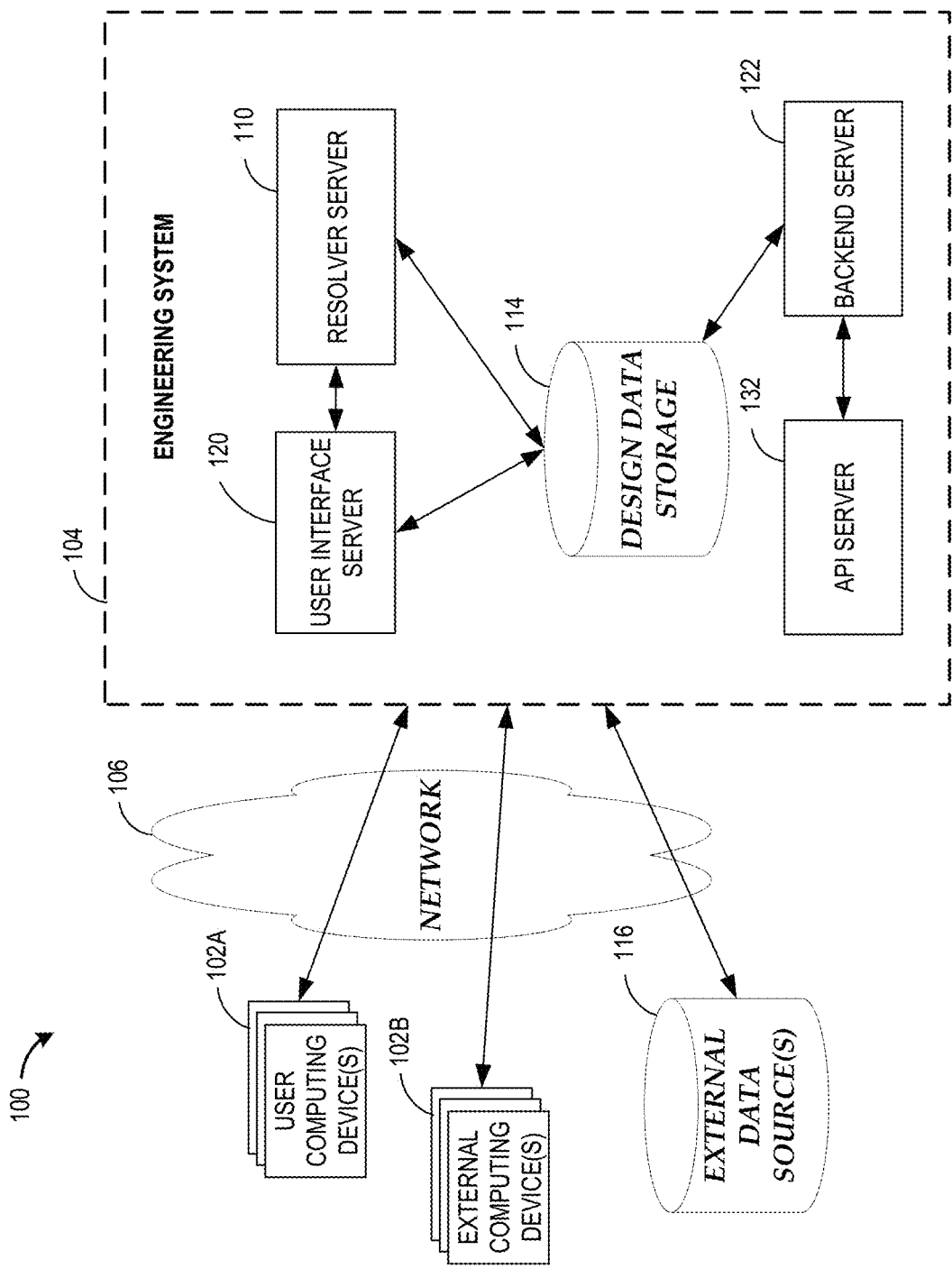
FIG. 1 is a block diagram depicting an illustrative network environment for implementing an engineering system.

As described above, the design of electronic hardware systems is a technical engineering process. In particular, the development of design files is usually performed through the usage of computers and appropriate Engineering Design Automation (EDA) software tools, where the engineer can manually create drawings that logically represent the electronic hardware systems, commonly referred to as "schematics," "schematic files," or "diagrams," and mechanical drawings of the physical implementation of such systems, commonly referred to as a "layout" of the design. With some prior EDA software tools, the engineer manually specifies the physical connections between ports of components when designing an electronic hardware system. Moreover, some prior EDA software tools lack the capability to automatically identify specific combinations of hardware components based on the input specifications, which can include the port mappings of the logical components.

Generally described, aspects of the present disclosure are directed to improved systems and methods that automate electronics design. The system can receive an electronics system design as input, which may or may not specify particular connections between ports of components of the electronics system. The electronics system design may in part be specified by a user. Other aspects of the electronics system design may be specified via machine-to-machine communication, such as, but not limited to, input design data received via an Application Programming Interface (API), data feed, data scraping, and/or an external database. As diagrammed or represented, each component of the electronics system design can be a data object, which can serve as a placeholder for an actual hardware component. The system, using the input electronics system design data, can execute a search algorithm to query a hardware components database to identify, rank, and select hardware components that are compatible with the input requirements. The graphical user interface of the system can allow a user to specify a high-level connection between components and the system can automatically select compatible ports between the components. The graphical user interface can provide error notifications. In some embodiments, the graphical user interface can provide error messages, such as, but not limited to, providing an alert if the system is unable to find a hardware component that is compatible with the input requirement or if an invalid connection is determined.

As described herein, the system can automatically resolve hardware connections and ports for an electronics system design, which can be referred to as exploring a search tree of hardware components and ports. While resolving ports and hardware components and applying a port allocation algorithm, the system can assign unavailability labels to resolved ports. The system can try to rearrange the ports to maximize the amount of available ports for a certain design by removing the unavailability labels and trying different combinations. In other words, the system can explore different portions of the search tree if the port allocation algorithm hits a dead end. The system can also rearrange configurations of pins, especially on programmable devices, so that the likelihood of fulfilling port requirements is higher. For example, typically many of the pins on a microcontroller can be configured as GPIO, but just a few pins can be configured as clock input. Without the port allocation algorithm described herein, if the clock-input-capable pins are initially randomly allocated to fulfill GPIO requirements, any further clock input port requirements would not find compatible ports and generate an error. However, with the port allocation algorithm described herein, the algorithm can rearrange the initially allocated ports so that the few clock-input-capable pins can be rearranged for clock input, and the algorithm can allocate the other free pins to fulfill the GPIO port requirements. As described herein, a network or net can be a collection of two or more interconnected subcomponents. A group of nets from a schematic file can be a port. A signal can be a source of energy that transmits some information. Ports can receive signals. The port allocation algorithm can validate signals and nets for hardware components.

The systems and methods described herein may improve automated electronics design technology. The solutions described herein may address the technical challenges of selecting a set of hardware components from a hardware components database. Based on the number of components in a hardware components database and the particular electronics system design, the number of combinations of hardware components and/or port mappings can be in the millions. The problem of selecting a set of electronic components, as described herein, may be a non-deterministic polynomial-time hard or NP-hard problem and may not be able to be solved in polynomial time. Therefore, even with substantial computing power, traditional optimization algorithms (such as algorithms for solving the problem of finding a best solution from all feasible solutions or feasible solutions from many permutations of options) for selecting a set of hardware components can take hours or days to complete due to the vast number of possible combinations. The technical solutions described herein can enable the algorithms to complete in seconds, such as by reducing the number of intermediary search options based on a threshold number. Therefore, the systems and methods described herein for improved algorithms can enable computers to compute hardware recommendations faster than traditional algorithms.

The systems and methods described herein may improve graphical user interfaces for automated electronics design. As described herein, with some prior systems, the engineer manually specifies the physical connections between ports of components when designing an electronic hardware system, which can be a time consuming and tedious process. The solutions described herein may address the deficiencies of prior graphical user interfaces by allowing a user to specify a high-level connection and the system can automatically select compatible ports between components if one is available. Moreover, the improved graphical user interfaces can provide error messages, such as, but not limited to, providing an alert if the system is unable to find a hardware component that is compatible with the input requirement or if an invalid connection is determined, which are features that some prior graphical user interfaces may lack. Thus, the systems and methods described herein can improve over traditional graphical user interfaces for electronics design engineering.

Turning to FIG. 1, an illustrative network environment 100 is shown in which an engineering system 104 may automatically generate electronics designs. The network environment 100 may include one or more user computing devices 102A, one or more external computing devices 102B, an external data source 116, and the engineering system 104. The engineering system 104 may include a user interface server 120, a resolver server 110, and a design data storage 114. The constituents of the network environment 100 may be in communication with each other either locally or over a network 106.

User computing devices 102A can include, but are not limited to, a laptop, a tablet computer, a personal computer, and/or a smartphone. The user interface server 120 can provide a user interface. A user can provide, via the user computing device 102A and the user interface, requirements for an electronics design, which can include an electronics diagram. The input requirements can include, but are not limited to, connections between blocks, the port types for the connections between the blocks, port attributes, port directions, and/or port connection topologies, and/or specifications. The engineering system 104 can use the design data to automatically search for and identify hardware components that satisfy the input requirements.

The engineering system 104 can receive input requirements from sources other than the user computing device 102A, such as an external computing device 102B or an external data source 116. The external computing device 102B, via the API server 132 and an API, can provide input requirements to the engineering system 104. The engineering system 104 can receive input requirements from the external computing device 102B via an API. The engineering system 104 can receive input requirements from an external data feed or via data scraping the external data source 116. Each of these external sources may include electronics hardware design data, such as requirements for blocks, connections, and/or hardware components. The backend server 122 can process the hardware design data and store the data in the design data storage 114.

The resolver server 110 can be configured to execute a resolver service. The resolver service can execute an algorithm to automatically query, rank, and select hardware components that are compatible with the input requirements. In some embodiments, the resolver server 110 can communicate with the user interface server 120 to receive the input requirements. The resolver server 110 can communicate with and query the design data storage 114. In some embodiments, the resolver server 110 can provide the selected hardware components to the user interface server 120.

The design data storage 114 may be embodied in hard disk drives, solid state memories, any other type of non-transitory computer-readable storage medium. The design data storage 114 may include a data store. The design data storage 114 can store data (such as data objects) representing blocks and/or hardware components. As used herein, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, and/or any other widely used or proprietary format for data storage.

The network 106 may be any wired network, wireless network, or combination thereof. In addition, the network 106 may be a personal area network, local area network, wide area network, cable network, satellite network, cellular telephone network, or combination thereof. In addition, the network 106 may be a publicly accessible network of linked networks, possibly operated by various distinct parties, such as the Internet. In some embodiments, the network 106 may be a private or semi-private network, such as a corporate or university intranet. The network 106 can use protocols and components for communicating via the Internet or any of the other aforementioned types of networks, such as HTTP.

The engineering system 104 may be embodied in a plurality of devices. For example, the user interface server 120 and the resolver server 110 may each include one or more of a network interface, memory, hardware processor, and non-transitory computer-readable medium drive, all of which may communicate with each other by way of a communication bus. The network interface may provide connectivity over the network 106 and/or other networks or computer systems. The hardware processor may communicate to and from memory containing program instructions that the hardware processor executes in order to operate the user interface server 120 and the resolver server 110. The memory generally includes RAM, ROM, and/or other persistent and/or auxiliary non-transitory computer-readable storage media.

FIGS. 2A, 2B, 2C, 2D, 2E, 2F, 2G, 2H, 2I, 2J, 2K, 2L, 2M, 2N, 2O illustrate example user interfaces. In particular, 2A, 2B, 2C, 2D, 2E, 2F, 2G, 2H, 2I, 2J, 2K, 2L, 2M, 2N, 2O illustrate example user interfaces of the engineering system 104 described above with respect to FIG. 1. In various embodiments, aspects of the user interfaces may be rearranged from what is shown and described below, and/or particular aspects may or may not be included.

Figure 2A:
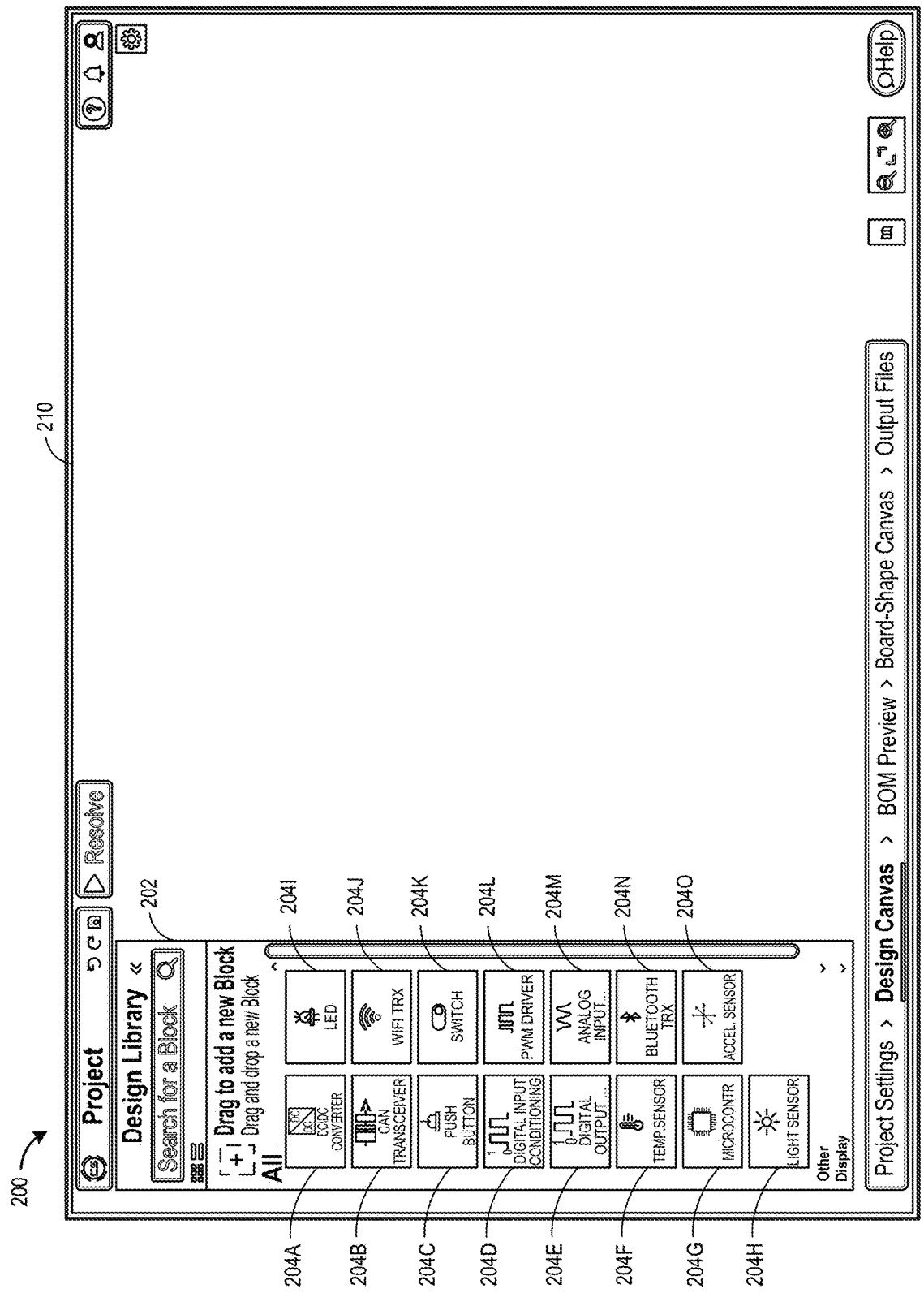
FIGS. 2A-2O depict graphical user interfaces for designing electronic hardware systems.

FIG. 2A illustrates a user interface 200 for designing electronic hardware systems. The user interface 200 can allow a user to create a block diagram representing an electronics hardware system. The user interface 200 can include a library area 202 and a canvas area 210. A user can design a block diagram in the canvas area 210. The user can search for, find, and/or select blocks 204A, 204B, 204C, 204D, 204E, 204F, 204G, 204H, 204I, 204J, 204K, 204L, 204M, 204N, 204O in the library area 202 to add to a block diagram. Depending on the embodiment, different blocks can be shown in the library area 202 other than what is shown in FIG. 2A. As described herein, blocks can have ports.

Each block 204A, 204B, 204C, 204D, 204E, 204F, 204G, 204H, 204I, 204J, 204K, 204L, 204M, 204N, 204O can correspond to a data object. As shown, blocks 204A, 204B, 204C, 204D, 204E, 204F, 204G, 204H, 204I, 204J, 204K, 204L, 204M, 204N, 204O can include, but are not limited to, a "DC \DC Converter," a "CAN Transceiver," a "Push Button," a "Digital Input Conditioning," a "Digital Output," a "Temperature Sensor," a "Microcontroller," a "Light Sensor," an "LED," a "WIFI TRX," a "Switch," a "PWM Driver," an "Analog Input," a "Bluetooth TRX," and an "Accelerometer Sensor" block. A user can use the library area 202 to search for blocks. In some embodiments, a user can add new blocks to the engineering system 104. There can be a one-to-many relationship between each block type and specific hardware components that are compatible with the requirements for a block of the respective block type. In other words, each block can represent a placeholder for a hardware component in an electronics system design. As described herein, the system can automatically recommend a hardware component and/or combinations of hardware components from hundreds of thousands or millions of options.

Figure 2B:
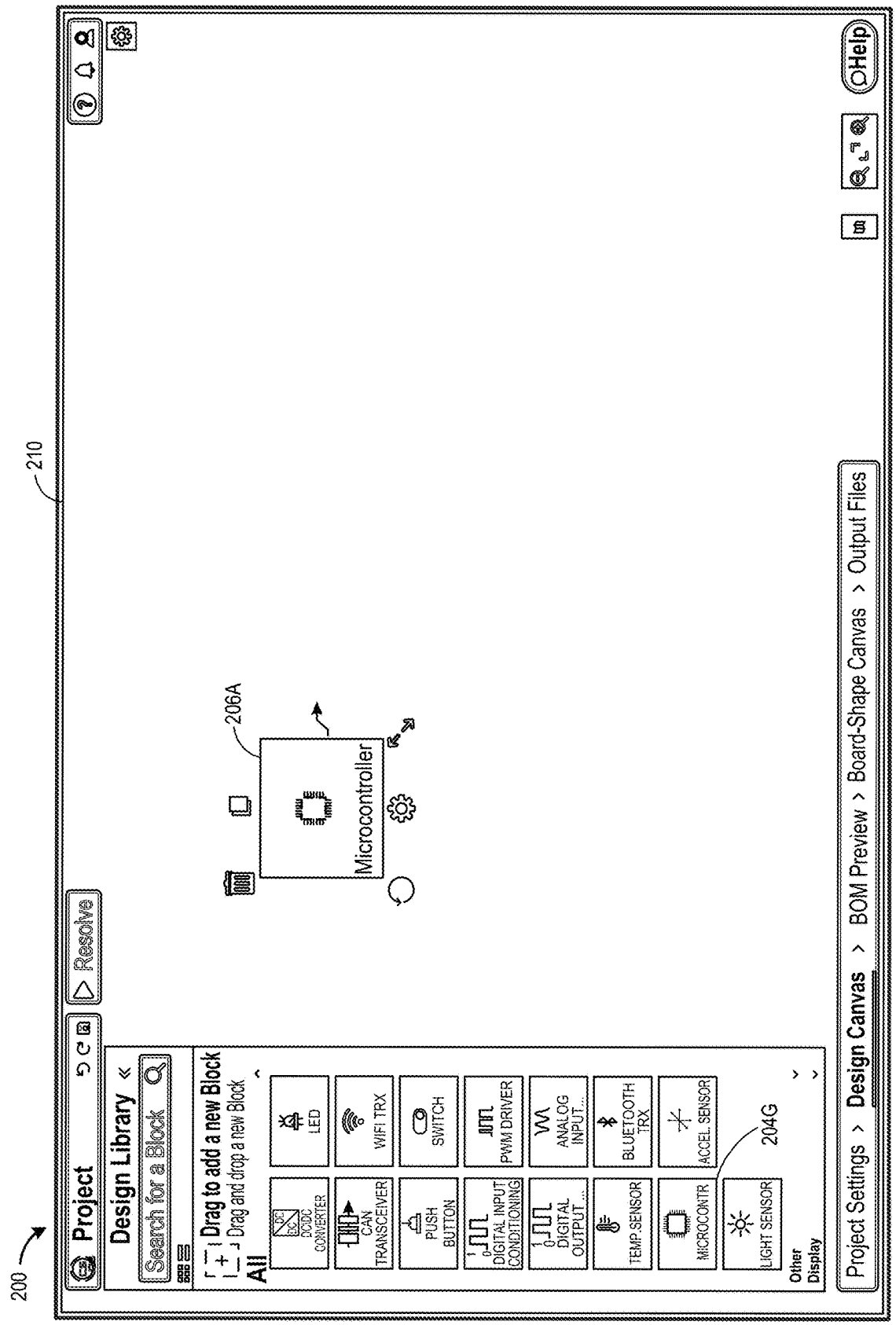
Figure 2C:
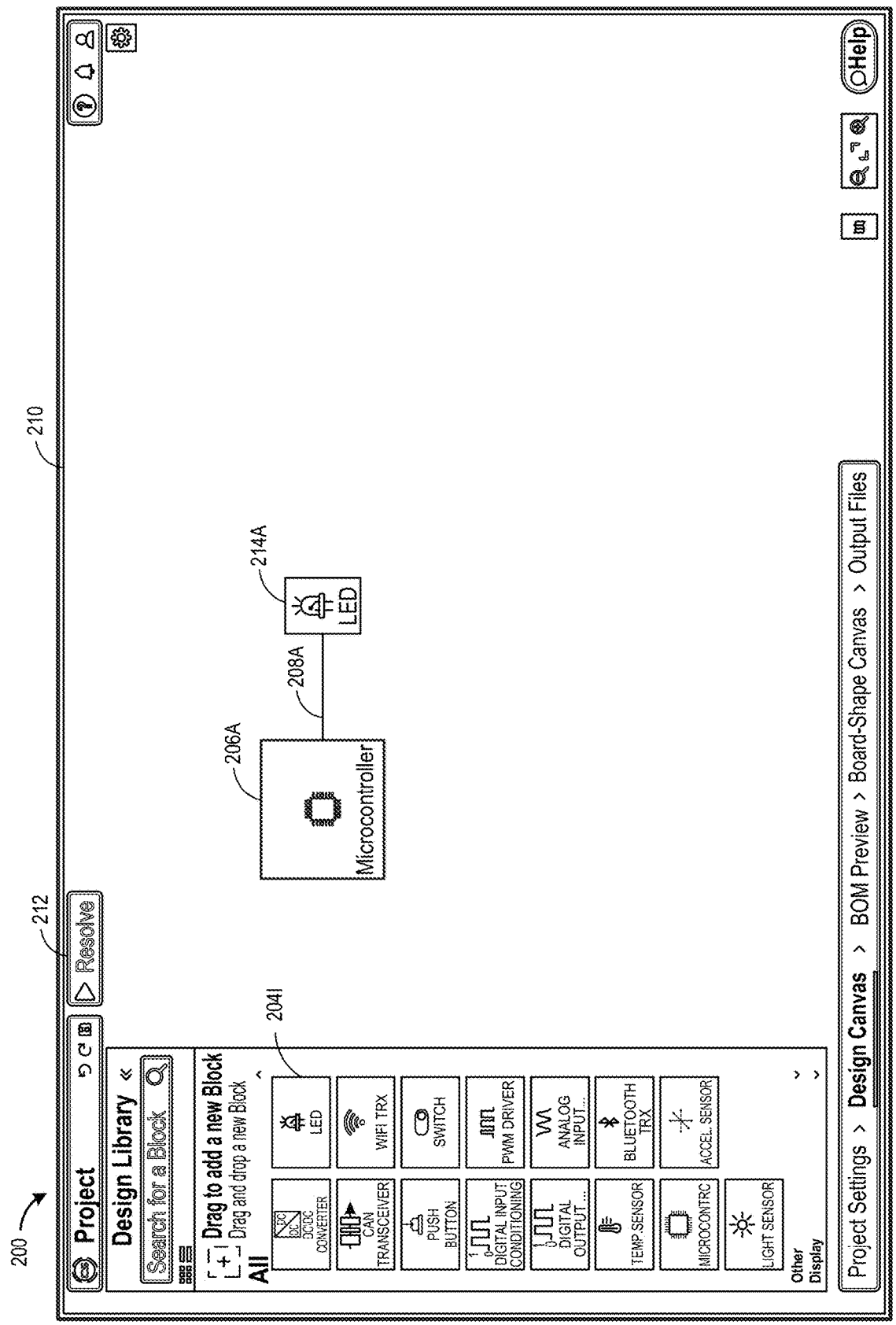

In FIG. 2B, the user interface 200 can allow a user to select a block. A user can drag a first block 204G from the library area 202 into the canvas area 210. As shown, a new first block 206A (the "Microcontroller" block here) can be created in the canvas area 210 in response to the user selection. In FIG. 2C, the user interface 200 can allow a user to select an additional block and make a connection. A user can drag a second block 204I from the library area 202 into the canvas area 210. As shown, a new second block 214A (the "LED" block here) can be created in the canvas area 210 in response to the user selection. A user can create a connection 208A between the first block 206A and the second block 214A. The connection 208A can be a "high-level" connection, which can be a connection where a user has not specified one or more port types for the connection. As described herein, the engineering system 104 can automatically resolve hardware components for each of the blocks 206A, 214A, which can include selecting a compatible port for the high-level connection 208A. The user interface 200 can also support receiving user-specified port type(s) for the connection 208A. In addition to the user-provided requirements shown in FIG. 2C, the user interface 200 can receive other requirements, such as, but not limited to, port attributes, port directions, and/or port connection topologies, etc. A user can initiate the resolving process by selecting the resolve element 212.

Figure 2D:
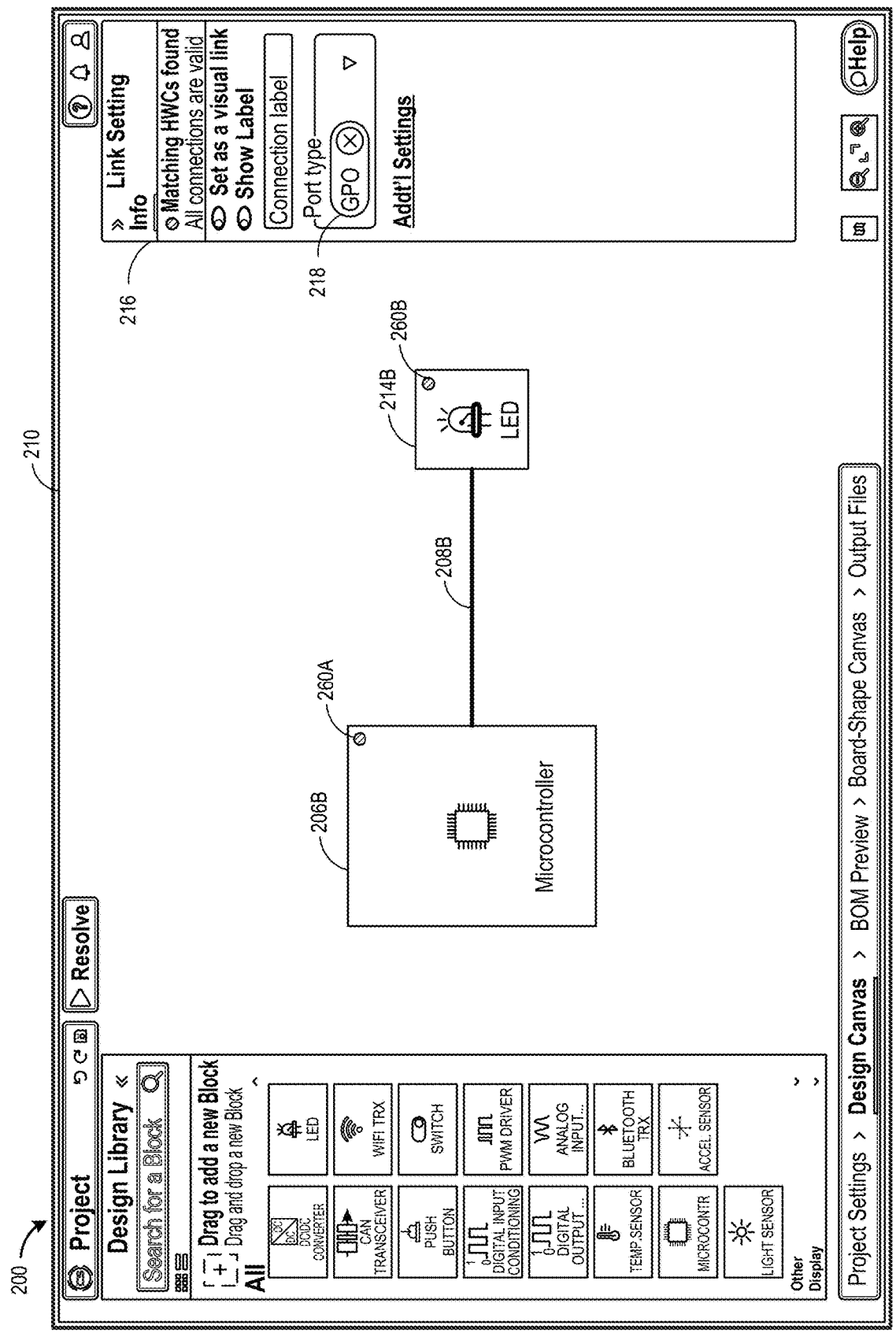

In FIG. 2D, the user interface 200 can present the results of the resolving process. As described herein, the engineering system 104 can automatically select hardware components for each block and/or identify compatible ports for connections between blocks. As shown, the presented blocks 206B, 214B can include a visual indicator 260A, 260B that demonstrates a hardware component has been resolved for each block. A user can select one of the resolved blocks 206B, 214B and information for the resolved block can be shown, such as the automatically selected hardware component and/or other hardware recommendations, which is described in further detail below with respect to FIG. 2E. A user can select the connection 208B and settings for the connection can be shown in the settings area 216. Thus, in the settings area 216, a particular port type 218 (here a "GPO" port type) has been automatically selected.

Figure 2E:
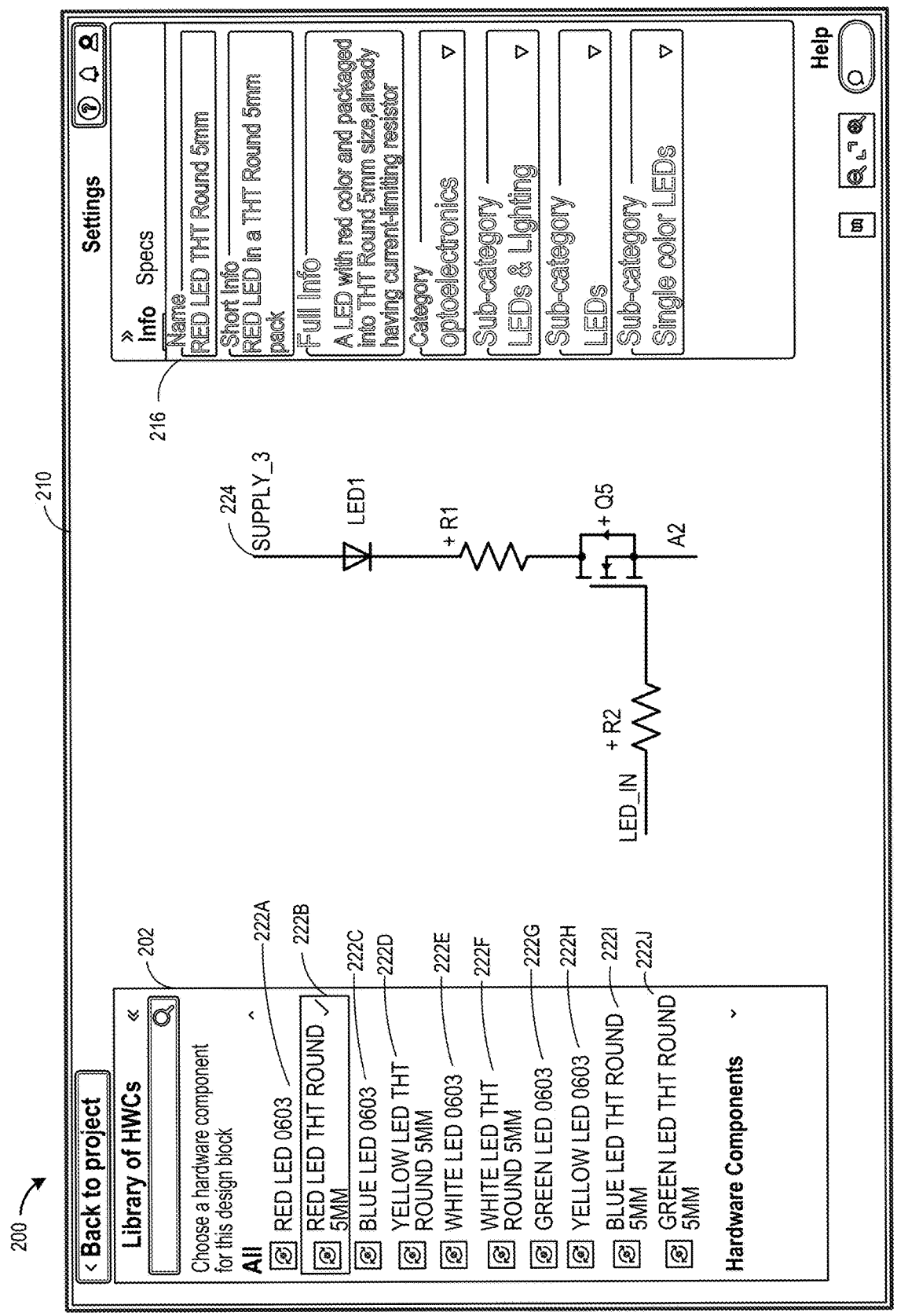

In FIG. 2E, the user interface 200 can present information regarding a resolved block. The presented hardware component 224 (here the "RED LED THT ROUND 5 MM" component) can be the hardware component that was selected for the second block 214B as shown and described above with respect to FIG. 2D. The hardware components 222A, 222B, 222C, 222D, 222E, 222F, 222G, 222H, 222I, 222J can be automatically recommended by the engineering system 104 and can be presented in the library area 202 of the user interface 200. As described herein, the engineering system 104 can recommend the hardware components 222A, 222B, 222C, 222D, 222E, 222F, 222G, 222H, 222I, 222J from thousands of other hardware options based on the input requirements. Information regarding the hardware component 224 can be presented in the settings area 216. While not shown in FIG. 2E, different hardware components can be presented in the user interface 200, such as the resolved hardware components for the first resolved block 206B described above with respect to FIG. 2D (which can be microcontroller hardware components). As shown, the user interface 200 can also present the circuit schematics (including a netlist) of the hardware component 224. The presented circuit schematics of the hardware component 224 can include resistors, a diode, and a metal-oxide-semiconductor field-effect transistor (MOSFET). The netlist for the hardware component 224 can include LED_IN, SUPPLY_3, and A2.

A hardware component may be referred to as a "low-level data object" or a "HWC." The low-level data objects can correspond to the building block components of an electronics system design. Each of the hardware components 222A, 222B, 222C, 222D, 222E, 222F, 222G, 222H, 222I, 222J in the user interface 200 can be associated with a respective low-level data object that can be used to describe an electronics hardware system. Each low-level data object can include a netlist (a list of the electronic components in a circuit and a list of the nodes they are connected to), in the form of schematics and a bill of materials (BOM), and a layout. In some embodiments, a user can add new hardware components to the engineering system 104. Additional details regarding adding new hardware components can be found in U.S. patent application Ser. No. 18/301,139, filed Apr. 14, 2023, titled "MACHINE LEARNING BASED PROCESSING OF DESIGN FILES FOR ELECTRONICS HARDWARE DESIGN," the disclosure of which is hereby incorporated by reference in its entirety.

Figure 2F:
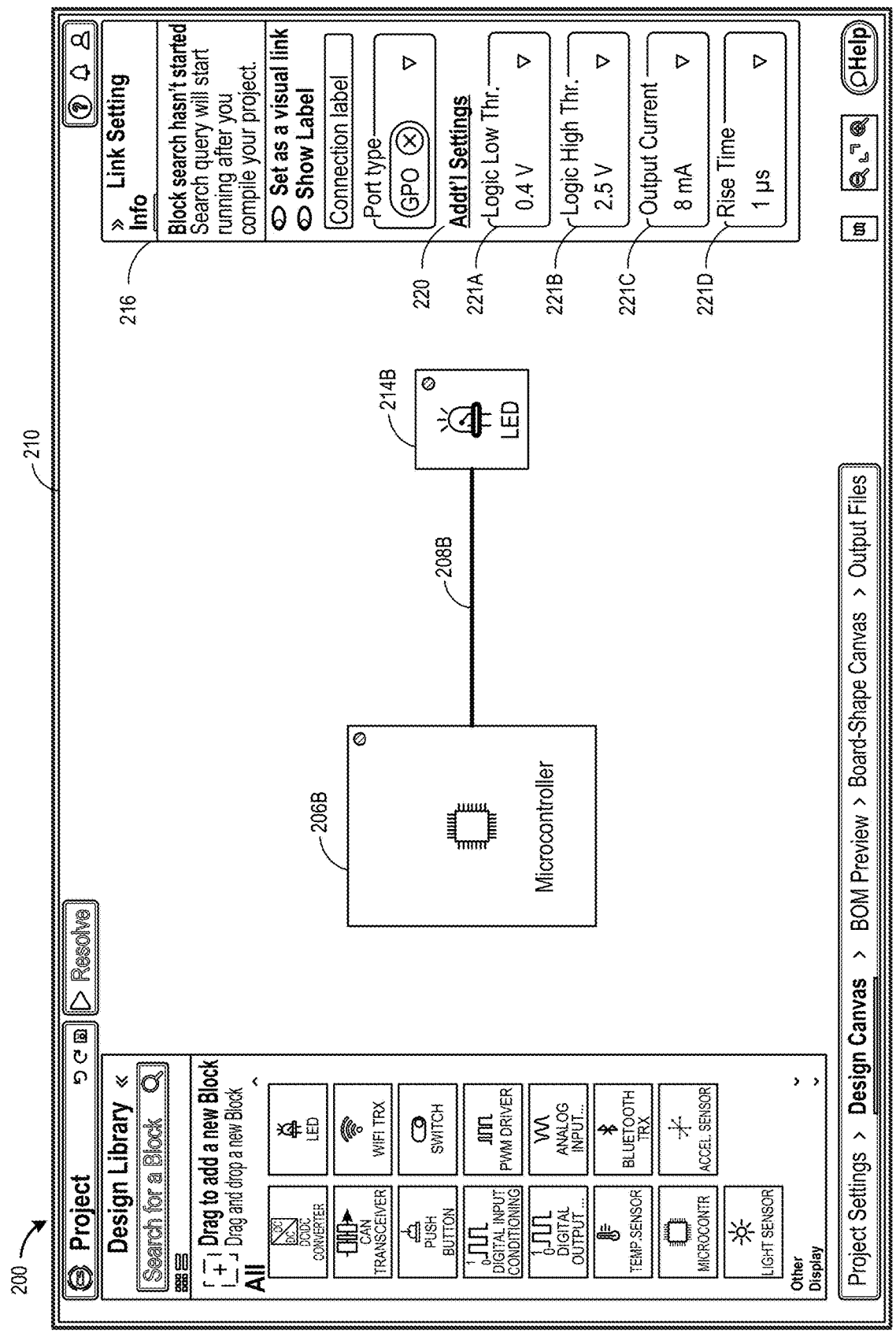

In FIG. 2F, the user interface 200 can allow a user to specify additional settings for the connection 208B. In the settings area 216, a user can select the additional settings element 220 to specify additional settings 221A, 221B, 221C, 221D. As shown, a user can specify additional settings 221A, 221B, 221C, 221D for the connection 208B, such as, but not limited to, voltage thresholds 221A, 221B, an output current 221C, and/or a rise time 221D.

Figure 2G:
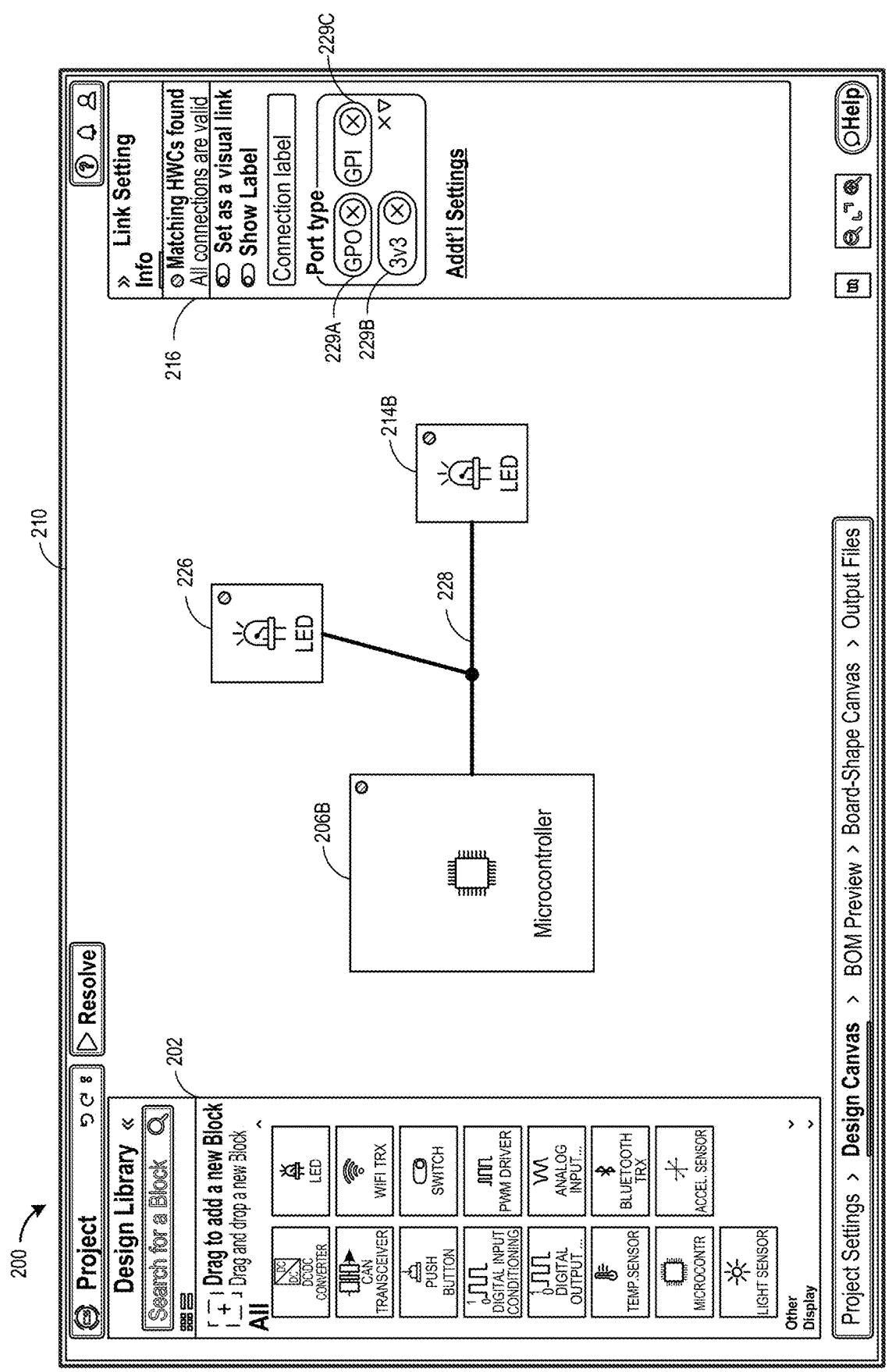

In FIG. 2G, the user interface 200 can allow a user to select an additional block and make a junction connection. A junction connection can refer to a connection between three or more blocks. A user can select a block from the library area 202 to add to the canvas area 210. As shown, a third block 226 (another "LED" block here) can be created in the canvas area 210 in response to the user selection. A user can create a junction connection 228 between the first block 206A, the second block 214A, and the third block 226. A user can select the junction connection 228, which can cause the user interface 200 to present the settings area 216 for the junction connection 228. A user can specify multiple port types 229A, 229B, 229C for the junction connection 228. If the engineering system 104 automatically resolves the hardware components for each of the blocks 206B, 214B, 226, then the engineering system 104 can use one of the port types 229A, 229B, 229C for the junction connection 228 as part of the resolving process.

Figure 2H:
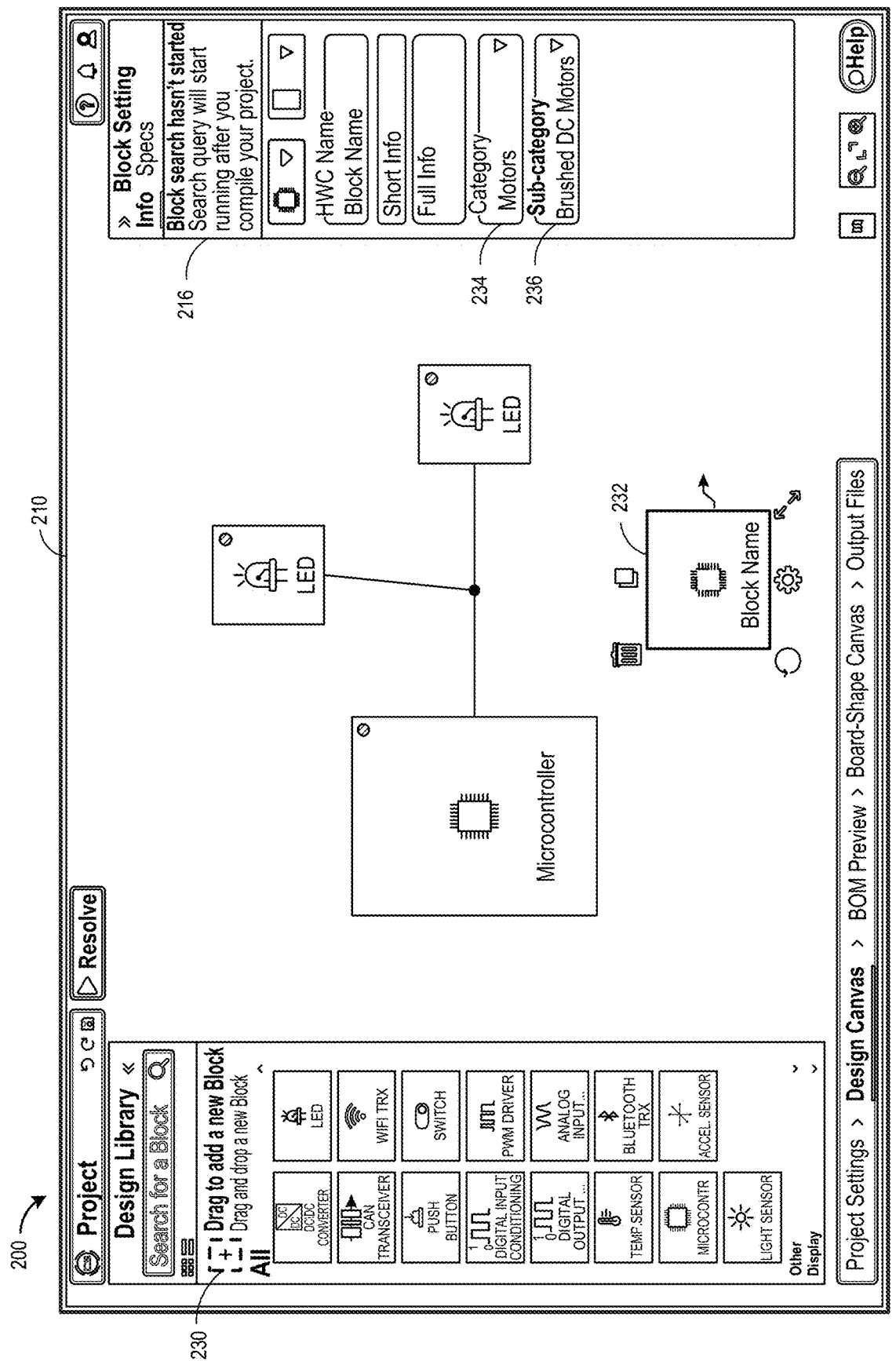
Figure 21:
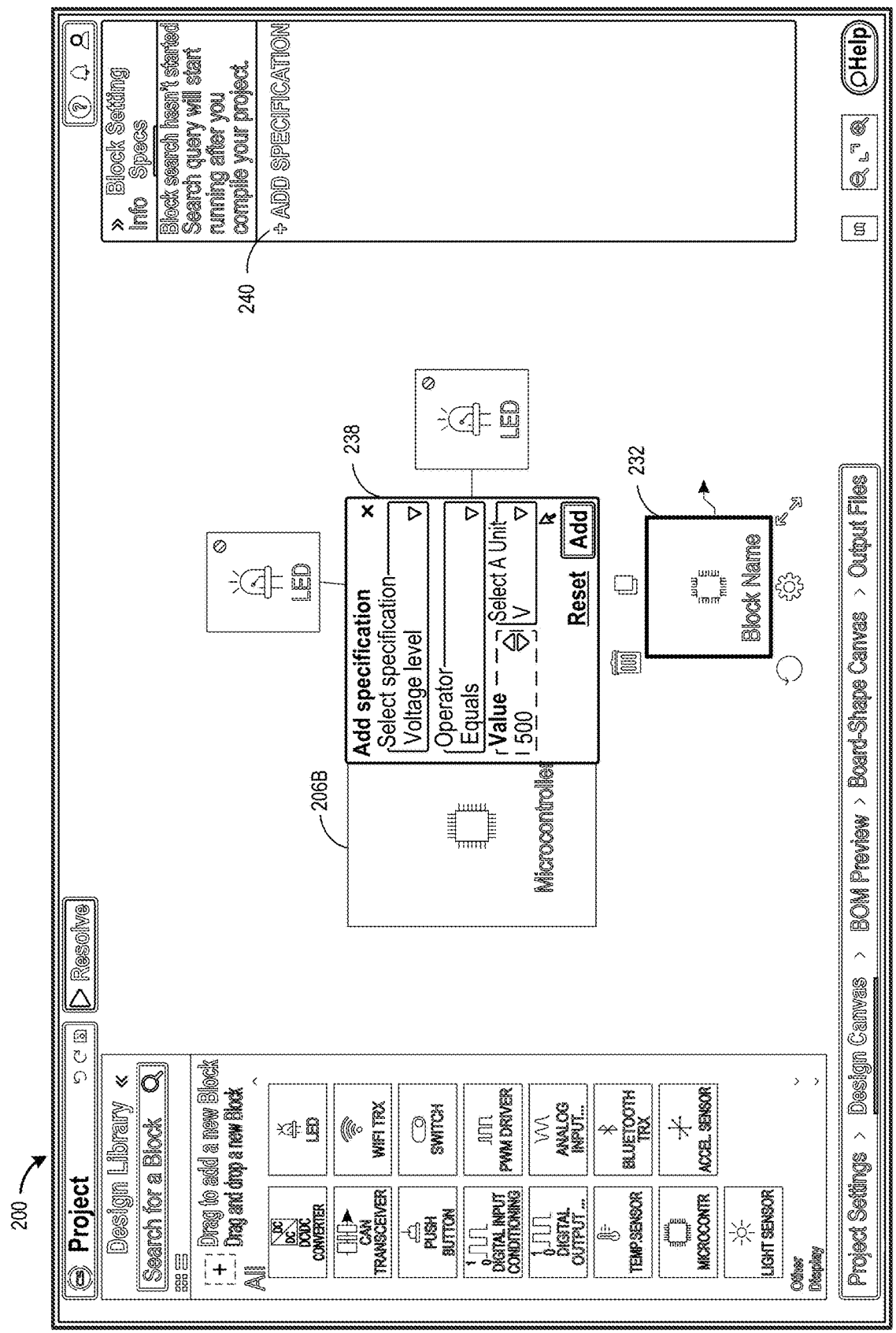

FIGS. 2H, 2I, 2J, 2K, 2L, 2M, 2N illustrate the error notification features of the user interface 200. In FIG. 2H, the user interface 200 can allow a user to perform a search for blocks. A user can select the add-a-new-block element 230 to add the generic block 232 to the canvas area 210. A user can search for blocks using the generic block 232. A user selection of the generic block 232 can cause the settings area 216 to display settings for the generic block 232. A user can provide a category 234 (here the "Motors" category) and a sub-category 236 (here the "Brushed DC Motors" category), which can be used as parameters by the engineering system 104 to conduct a block search.

Figure 2J:
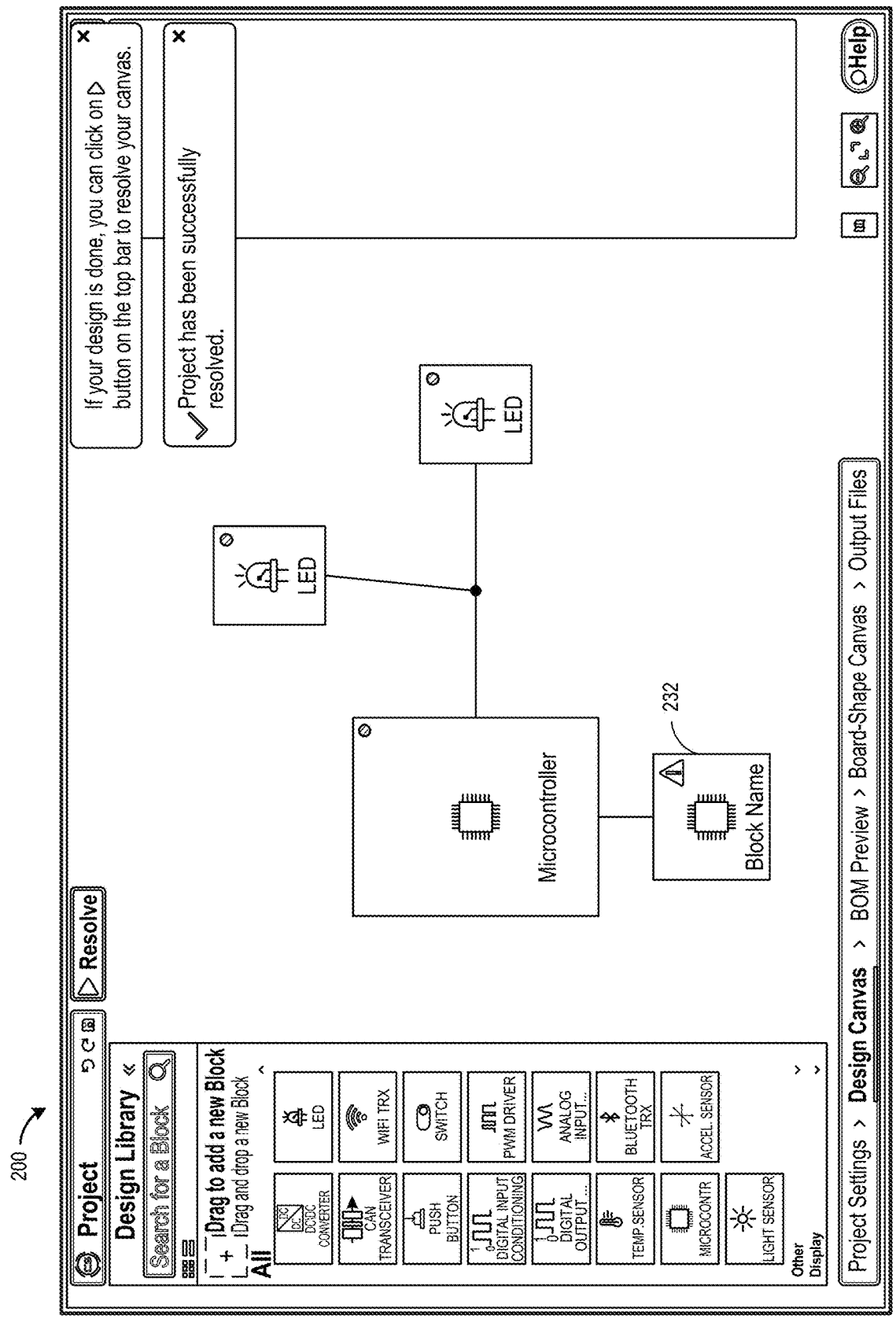

In FIG. 2I, the user interface 200 can allow a user to submit one or more specifications for a block. A user can select the add-specification element 240, which can cause the user interface 200 to present the add-specification area 238 for the selected generic block 232. In the add-specification area 238, a user can select a specific specification, an operator, and a value for the specification. As shown, a user can add a "Voltage level" specification with an "Equals" operator and a value of "500 V." A specification can be a requirement that is added to a block and that can be used by the engineering system 104 when searching for compatible hardware components. Thus, the engineering system 104 can search for any hardware components compatible with the specified category/sub-category (here a motor/brushed dc motor) and specification (here a "Voltage Level" that "Equals" a value of "500 V"). In some embodiments, a specification can be a requirement for an attribute of a block. In some embodiments, there can be many (such as hundreds or thousands) of attributes that a user can use in a specification. Additional operators, can include, but are not limited to, "Not equal to," "Greater than," "Less than," "Greater than or equal to," "Less than or equal to," or "Between." Following entering of the specification, a user can take additional operations (not shown in FIG. 2I), such as making a high-level connection between the generic block 232 and another block in the diagram, such as the first block 206B. The resolving process for the diagram, which can include the generic block 232, can be initiated. In FIG. 2J, the user interface 200 can present the results of the resolving process. As shown, the generic block 232 can present an indicator (such as a computer icon or other visual indicator) that there was an error, such as the engineering system 104 being unable to locate a hardware component that satisfies the input requirements for the block (such as the voltage level for a motor having a value of "500 V").

Figure 2K:
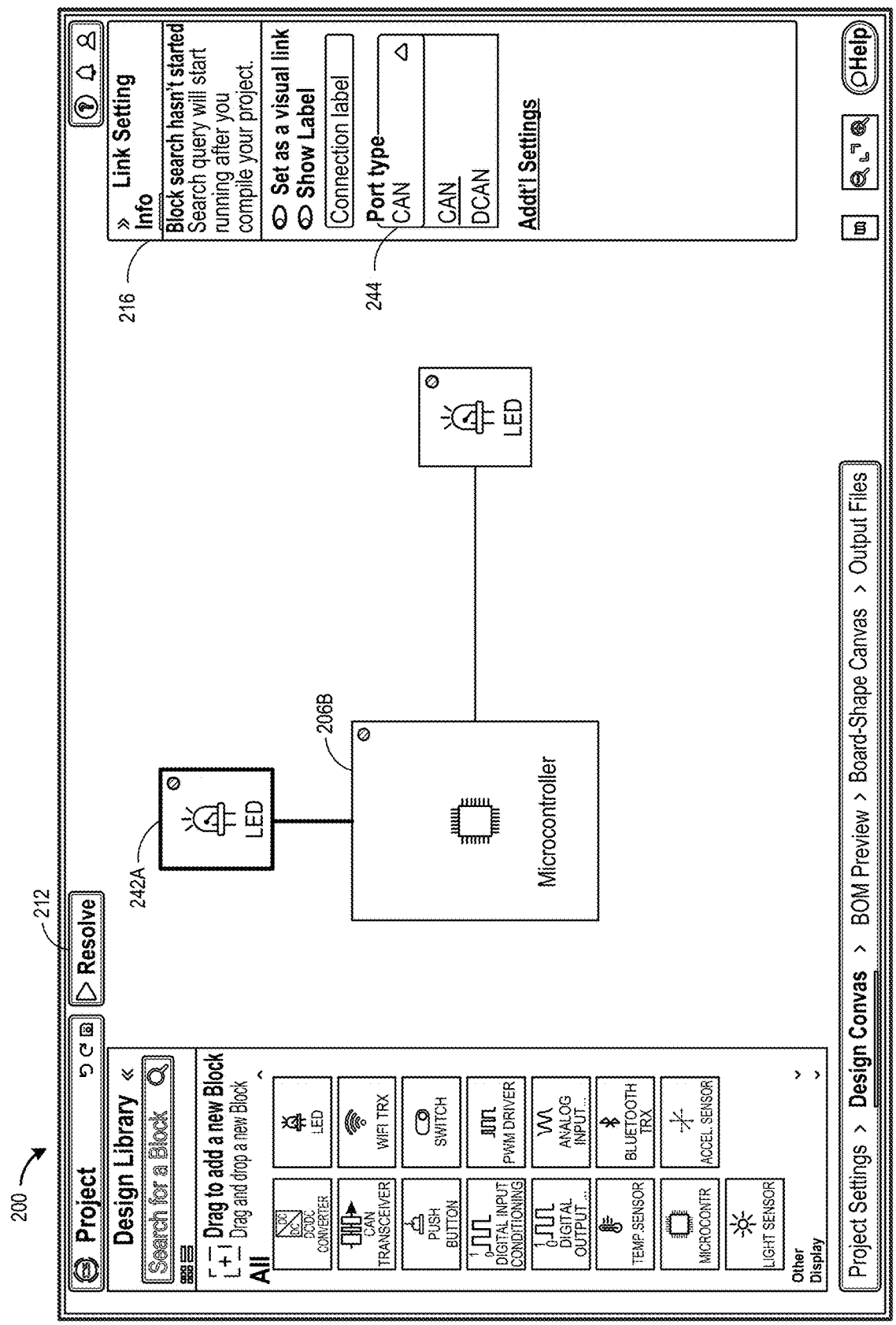
Figure 2L:
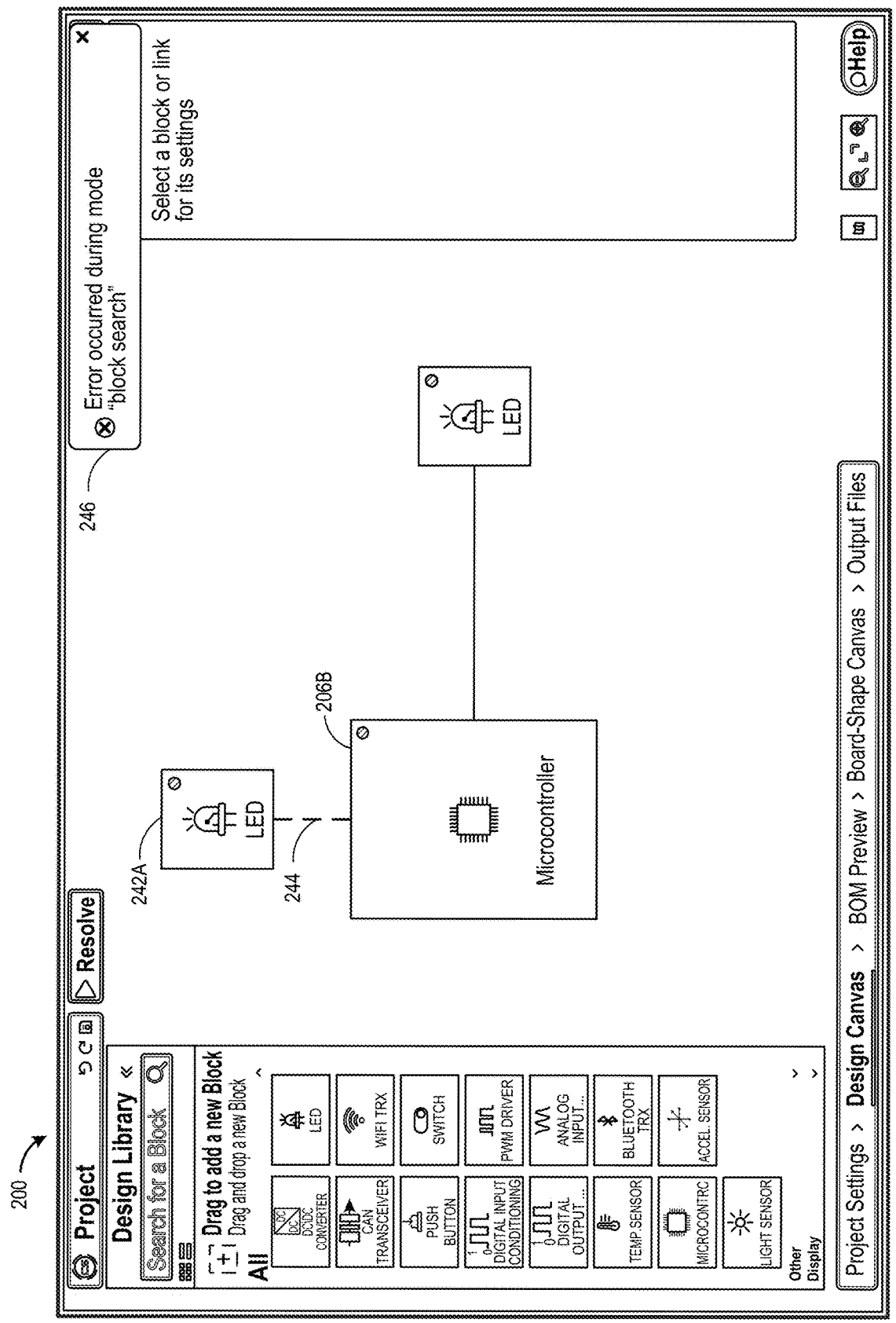

In FIG. 2K, the user interface 200 can allow a user to submit one or more port types for a block. A user can modify the diagram from FIG. 2J to result in the diagram of FIG. 2K. As shown in FIG. 2K, a user can specify a port type (here a "CAN" port type) in the settings area 216 for the selected block 242A that is connected to the first block 206B (here a Microcontroller block). A user can yet again initiate the resolving process by selecting the resolve element 212. In FIG. 2L, the user interface 200 can present the results of the resolving process. As shown, the user interface 200 can present an error message 246 indicating that there was an error, such as the engineering system 104 being unable to locate a specific port type (here a "CAN" port type) for hardware components for the first block 206B and the other block 242A, which are linked by the connection 244.

Figure 2M:
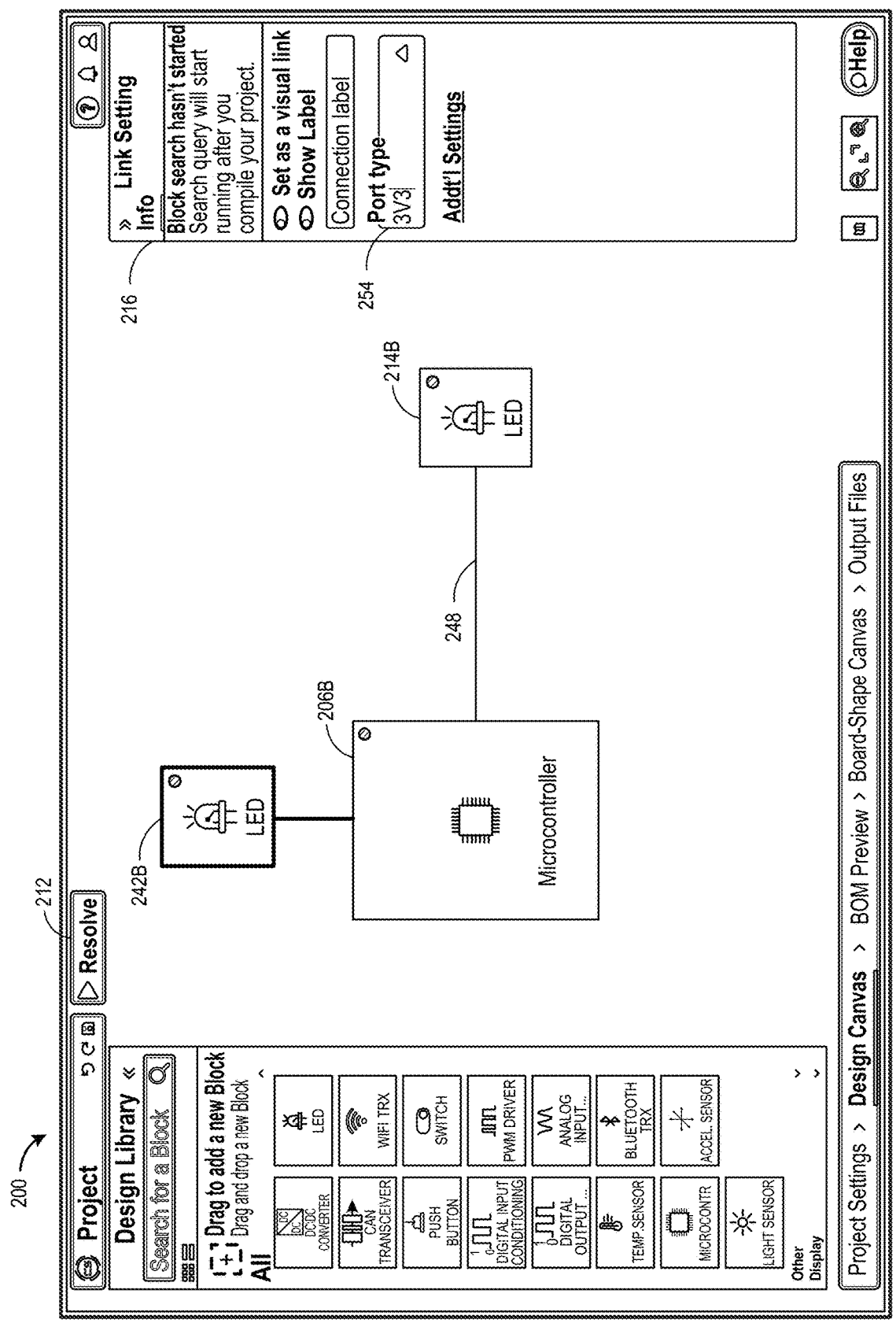
Figure 2N:
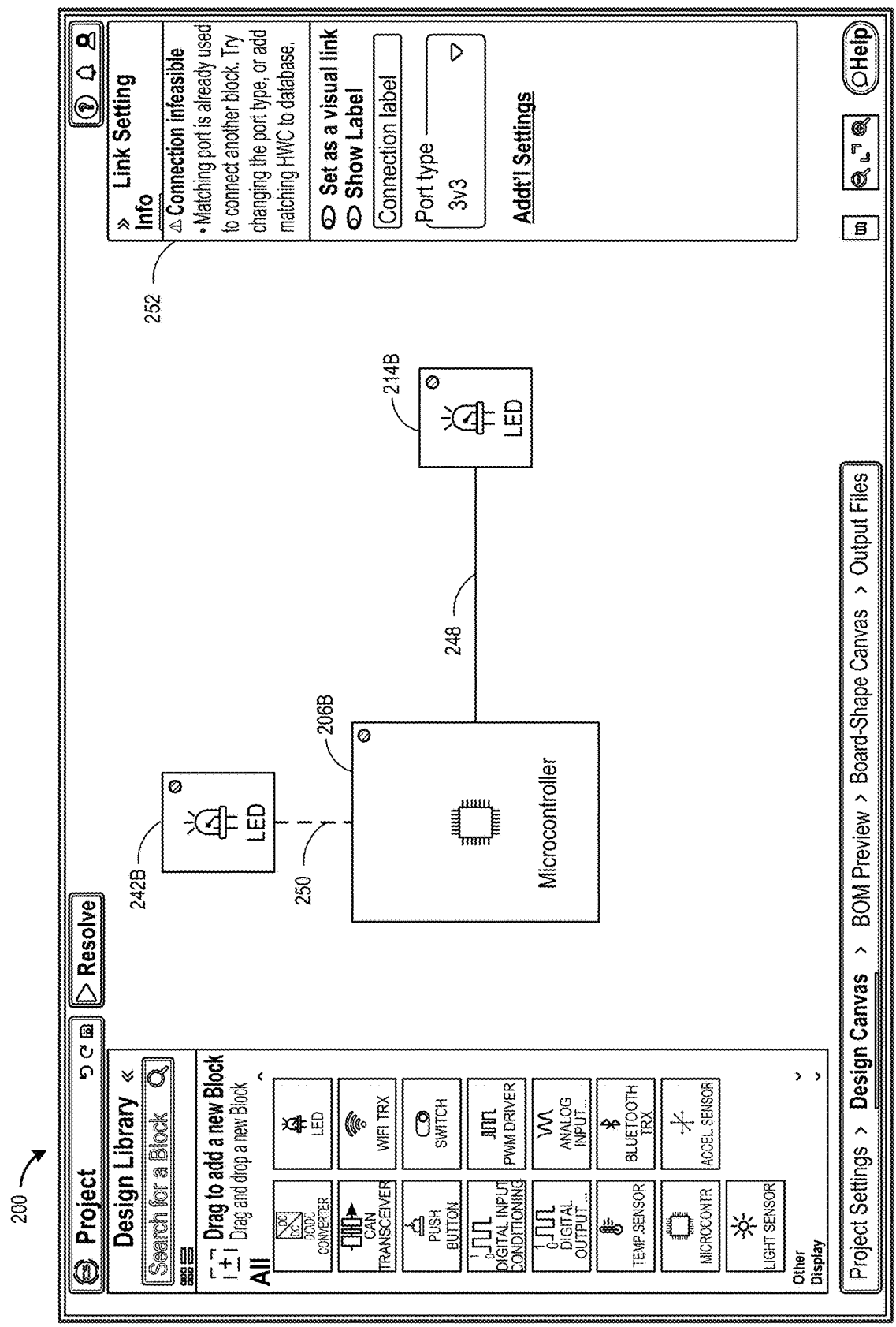
Figure 20:
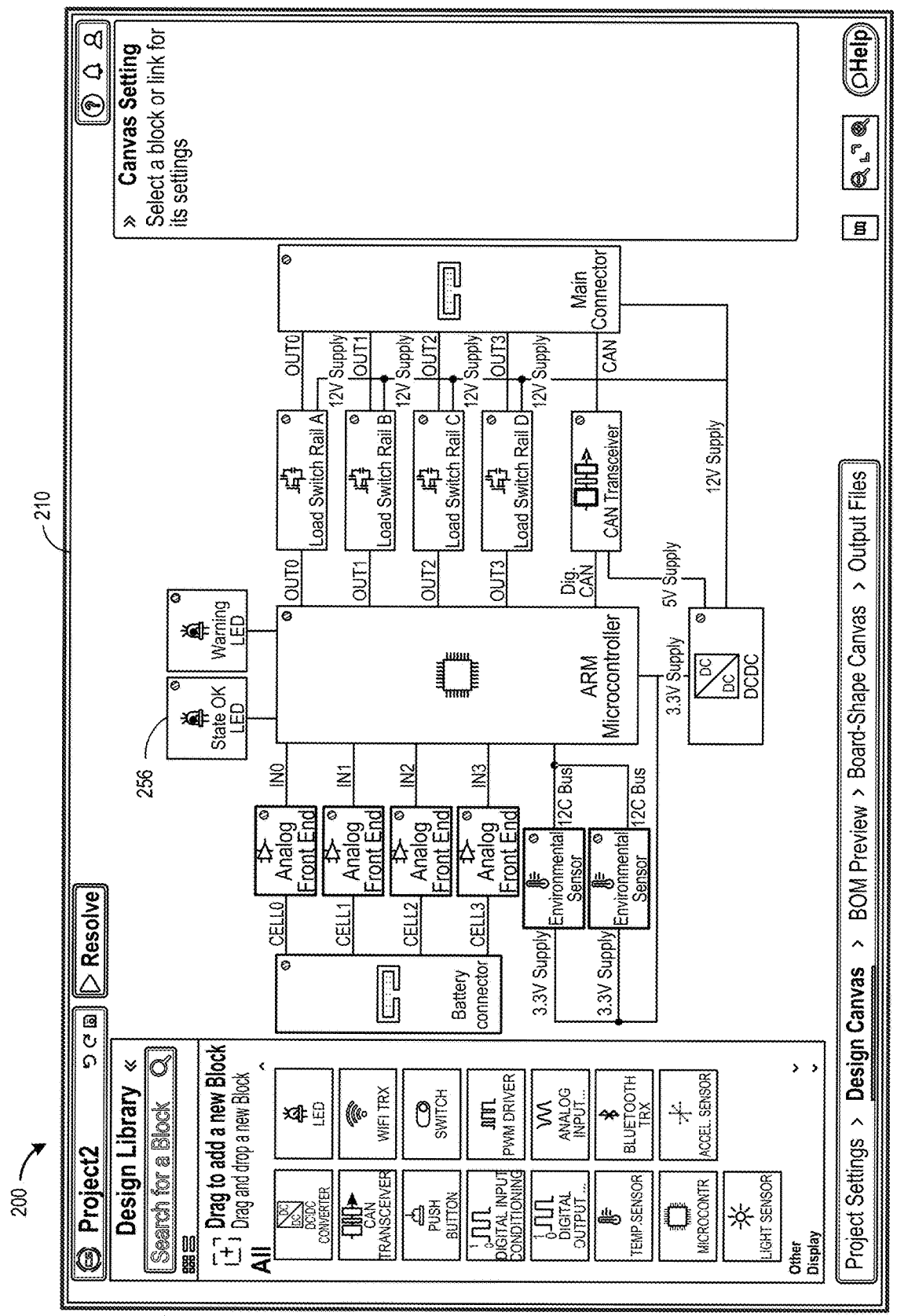

In FIG. 2M, the user interface 200 can allow a user to submit one or more port types for a block. As shown in FIG. 2M, a user can specify a first port type 254 (here a "3V3" port type) in the settings area 216 for the selected block 242B that is connected to the first block 206B (here a Microcontroller block). The port type for the connection 248 between the first block 206B and the second block 214B can be the same first port type 254 (such as a "3V3" port type). Thus, the two connections in the diagram can both be of the same port type. A user can initiate the resolving process by selecting a resolve element 212. In FIG. 2N, the user interface 200 can present the results of the resolving process. As shown, the user interface 200 can present an error message 252 indicating that there was an error, such as the engineering system 104 being unable to locate a specific, available port type (here a "3V3" port type) for hardware components for the first block 206B and the other block 242B. As mentioned above, the first connection 248 and the second connection 250 can be for a "3V3" port type; however, the second connection 248 may already be using the first port type and successful reconfiguration may not be possible. The error message 252 can indicate that "[a] Matching port is already used to connect another block . . . ." Thus, the engineering system 104 can provide an error message if, based on the available hardware components from the hardware components database, a compatible port is not available.

During the resolving process, the engineering system 104 can apply a port allocation algorithm. During execution, the port allocation algorithm can work to resolve port conflicts. Some blocks, such as a microcontroller, can provide more than one configurable type of port for a pin. As described herein, the port allocation algorithm can work through permutations of these configurations to try and solve port conflicts and resolve port dependencies for one or more blocks.

In FIG. 2O, the user interface 200 can present a new project. In the canvas area 210, a diagram 256 can be presented. As depicted, the blocks and links of the diagram 256 can be resolved. Accordingly, each of the blocks of the diagram 256 can have a corresponding recommended hardware component and each connection of the diagram 256 can have an assigned port type. As described herein, the engineering system 104 can efficiently resolve a particular combination of hardware components for the diagram 256 out of a large number of hardware components from the hardware components database and an even larger number of permutations of hardware components.

Figure 3A:
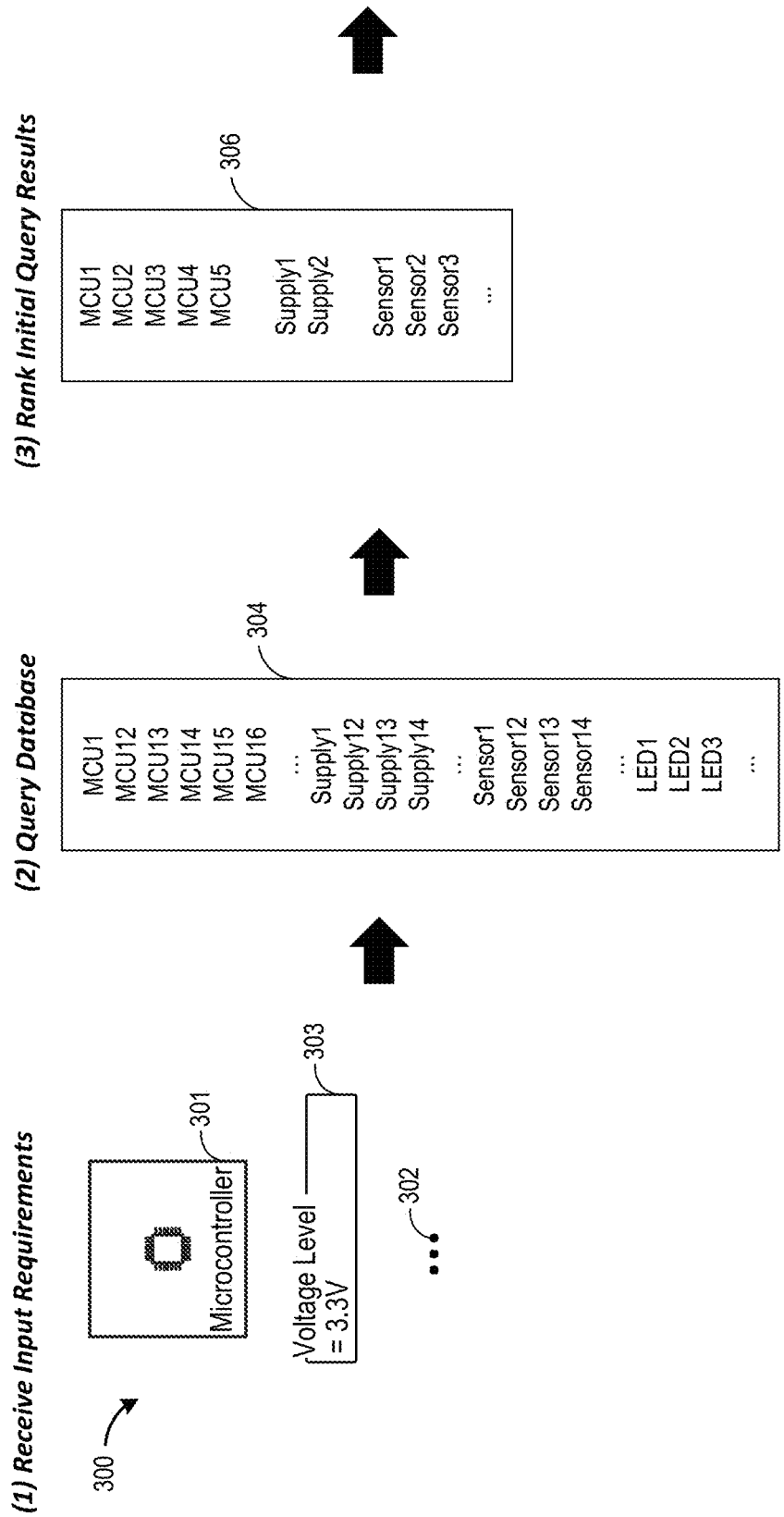
FIGS. 3A-3C are flow diagrams depicting steps for automatically resolving hardware components for an electronic hardware system.
Figure 3B:
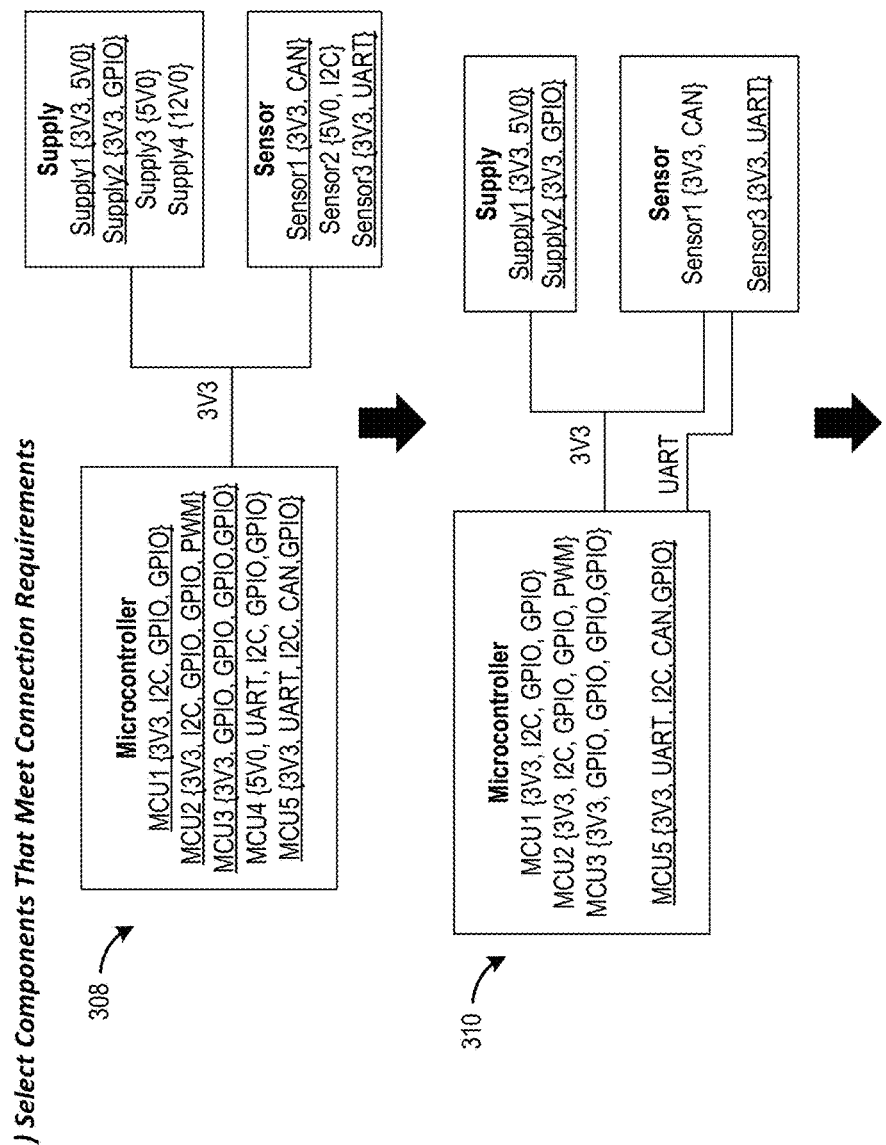
Figure 3C:
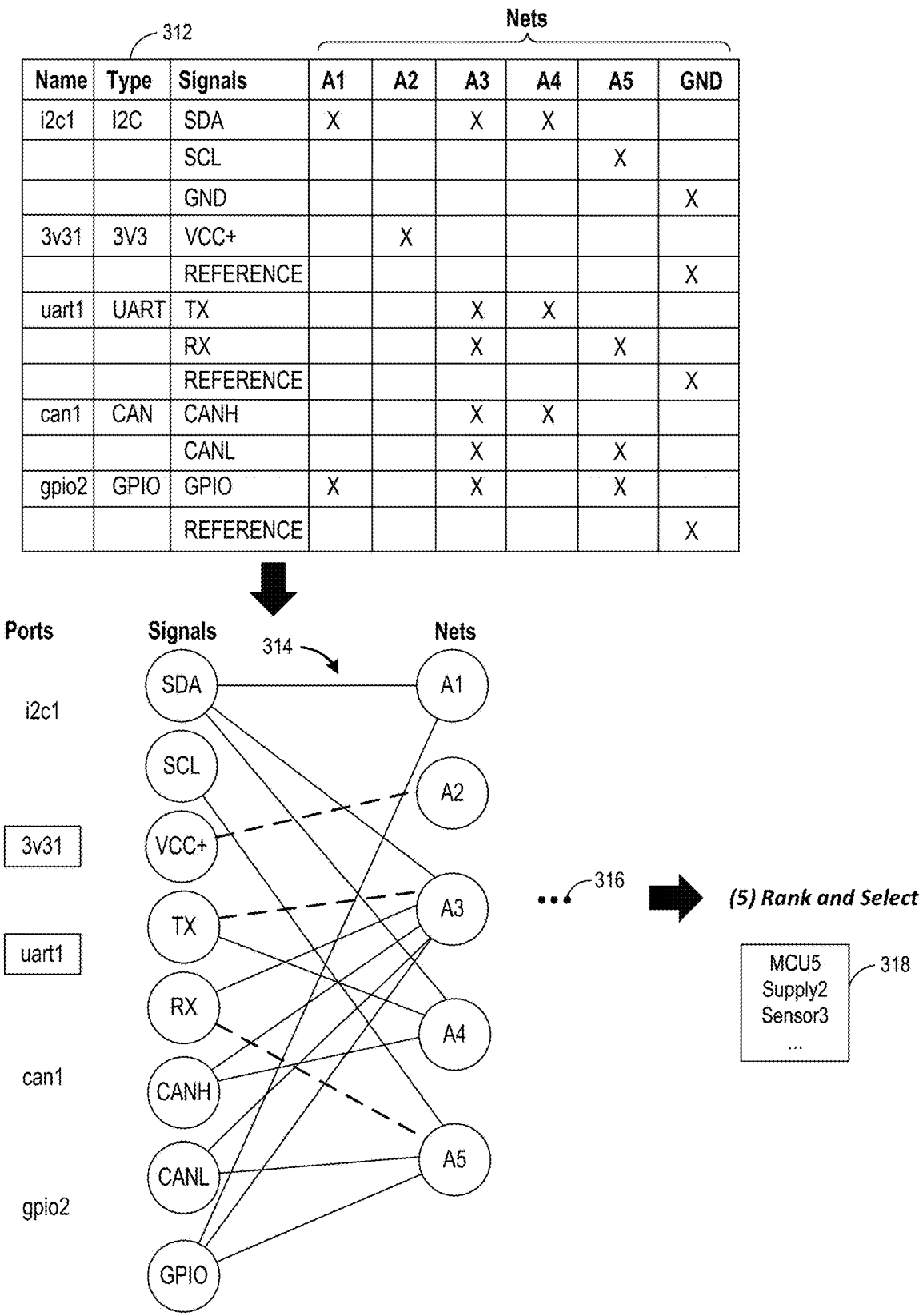

With reference to FIGS. 3A-3C, steps are depicted for automatically resolving hardware components for an electronic hardware system. Some of the depicted steps shown in FIGS. 3A-3C may be performed by components of the environment 100 of FIG. 1, such as the user interface server 120 and/or the resolver server 110. Some or all of depicted steps may be optional depending on the circumstances or embodiment. Other steps (not illustrated) may be possible in accordance with the present disclosure in other embodiments.

In FIG. 3A, at step one (1), the engineering system 104 can receive input requirements 300. As described herein, the input requirements 300 can be received, such as the user interface server 120 receiving requirements via user input. The input requirements 300 can include the blocks 301 of an electronics system design (such as a microcontroller block), which can include specification(s) 303 for the blocks, such as, but not limited to, a particular voltage level (here 3.3V), a maximum operating temperature, a maximum clock frequency, a memory size, etc. The user input can include one or more categories or sub-categories for each block (such as a "Microcontroller," "LED," or "Supply," category). While not shown, the input requirements 300 can include connections between the blocks. The depicted ellipsis 302 represents that the input requirements can include additional blocks and/or specifications. Additional details regarding receiving input requirements are described herein with respect to, but not limited to, FIGS. 2B, 2C, 2F-2I. As described above with respect to FIG. 2H, a user can use the add-a-new-block element 230 to add a block of a particular category or sub-category. The resolver server 110 can further receive the input requirements 300.

At step two (2), the resolver server 110 can query a hardware components database 304. In some embodiments, the resolver server 110 can query the hardware components database 304 multiple times, such as once per block in the input requirements 300. The resolver server 110 can query the hardware components database 304 based on the category type of each block and any specifications for each block. As shown, the hardware components database 304 can include representations of hardware components, such as, but not limited to, microcontrollers (MCUs), power supplies, sensors, LEDs, etc. At step three (3), the initial query results 306 can be ranked. The resolver server 110 can rank the hardware components based on criteria, such as, but not limited to, cost, quality (which can be defined by the user), area, component availability, or any other factor.

In FIG. 3B, at step four (4), the resolver server 110 can select hardware components that meet the connection requirements based on the electronics system design, which can include blocks and connections between blocks. A representation of a first portion 308 of the electronics system design is shown, which includes three blocks connected by a junction connection where each block is associated with the initial hardware-component results. As described herein, the initial query results of the hardware components can be ranked. As described herein, the connections between the blocks can be high-level connections in that a specific port type hasn't been selected and the resolver server 110 can select available port types based on the available hardware components. The resolver server 110 can determine that the junction connection with a specific port type of "3V3" and the hardware components "MCU1," "MCU2," "MCU3," "MCU5," "Supply1," "Supply2," "Sensor1," and "Sensor3" (as underlined in FIG. 3B) are feasible since each of the foregoing components have the same port type "3V3" available for use.

Continuing at step four (4), the resolver server 110 can further select hardware components that meet additional connection requirements based on the electronics system design. A representation of a second portion 310 of the electronics system design is shown, which includes the three blocks connected by the junction connection and an additional connection between the microcontroller block and the sensor block. As described herein, the connection between the microcontroller block and the sensor block can be a high-level connection. After processing the junction connection, the resolver server 110 can assign an unavailability label to the "3V3" port from the pool of ports and can begin processing the second connection between the microcontroller block and the sensor block. The resolver server 110 can determine that the second connection with a specific port type of "UART" and the hardware components "MCU5" and "Sensor3" (as underlined in FIG. 3B) are feasible since each of the foregoing components have the same port type "UART" available for use.

In FIG. 3C, the resolver server 110 can further resolve the hardware components based on port requirements for the electronics system design by performing port allocation. As described herein, some hardware components can be configurable, such as a programmable microcontroller component, and the port allocation can resolve and validate whether a hardware component has compatible signals and nets for the electronics system design. In FIG. 3C, a mapping 312 of nets to signals for the hardware component "MCU5" is shown. The resolver server 110 can generate the mapping 312. As shown in the mapping 312, the hardware component "MCU5" can have five ports: "i2c1," "3v31," "uart1," "can1," and "gpio2." Also as shown in the mapping 312, the hardware component "MCU5" can be associated with six nets: "A1," "A2," "A3," "A4," "A5," and "GND." Each of the signals in mapping 312 ("SDA," "SCL," and "GND" signals for the "i2c1" port; "VCC+" and "REFERENCE" signals for the "3v31" port; "TX," "RX," and "REFERENCE" signals for the "uart1" port; "CANH" and "CANL" signals for the "CAN" port; and "GPIO" and "REFERENCE" signals for the "GPIO" port) can be mapped to compatible nets in the mapping 312. For example, with respect to the "uart1" port and as shown by the "X" indicators in the mapping 312, the "TX" signal is compatible with the "A3" and "A4" nets and the "RX" signal is compatible with the "A3" and "A5" nets. As described herein, the signal and net compatibility can be user-defined or defined by other requirements received by the engineering system 104.

The resolver server 110 can convert the mapping 312 for the hardware component "MCU5" into the graph representation 314. Each of the edges in the graph representation 314 can correspond to an "X" indicator in the mapping 312. The graph representation 314 can be a bipartite graph. The resolver server 110 can validate the hardware component "MCU5" with the following conditions: (1) a signal (which can exclude reference signals such as "GND" or "REFERENCE") is allocated to a net; and (2) a net is not mapped to more than one signal. The resolver server 110 can determine a maximum flow between the signals and the nets for the ports in the electronics system design (here the "3v31" and "uart1" ports). As described herein, the resolver server 110 can apply a greedy algorithm, such as an Edmonds-Karp algorithm that can be a modified version of the Ford-Fulkerson algorithm, to the graph representation 314 to determine whether there is a compatible allocation of signals to nets for the hardware component "MCU5." As shown, the "VCC+" signal can be allocated to the "A2" net, the "TX" signal can be allocated to the "A3" net, and the "RX" signal can be allocated to the "A5" net. Thus, the resolver server 110 can validate that the hardware component "MCU5" has compatible signals and nets for the electronics system design.

The depicted ellipsis 316 represents that the resolver server 110 can continue processing additional portions of the electronics system design, which can include additional blocks and/or connections in the electronics system design (not depicted). The additional processing can include performing set operations to determine compatible ports and/or validating signals and nets for the hardware components.

At step five (5), the remaining hardware components can be ranked (if applicable) and selected. The resolver server 110 can select the hardware components "MCU5" and "Sensor3" as the recommended hardware components based on the first and second connections. The resolver server 110 can use a ranking for the hardware components "Supply1" and "Supply2" to select the hardware component "Supply2" as the higher ranked component. Thus, the resolver server can determine and provide the recommended hardware components 318, which can include the ports for the connections between the hardware components.

Figure 4A:
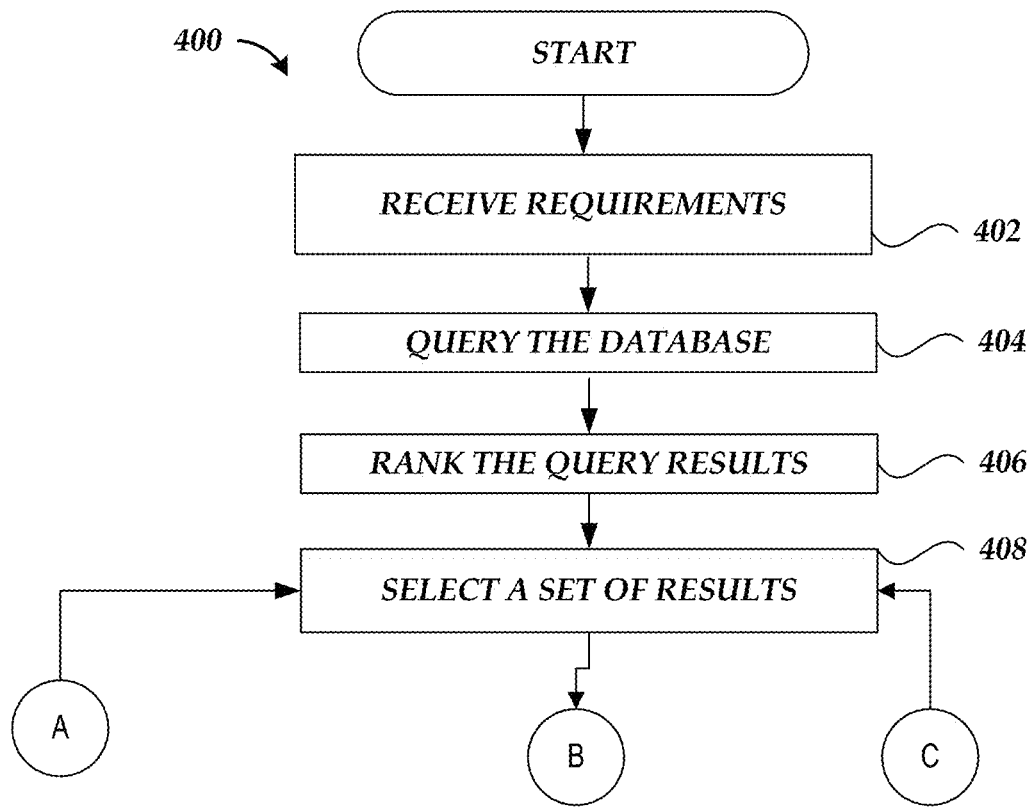
FIGS. 4A-4B are flow charts depicting a method for automated electronics design.
Figure 4B:
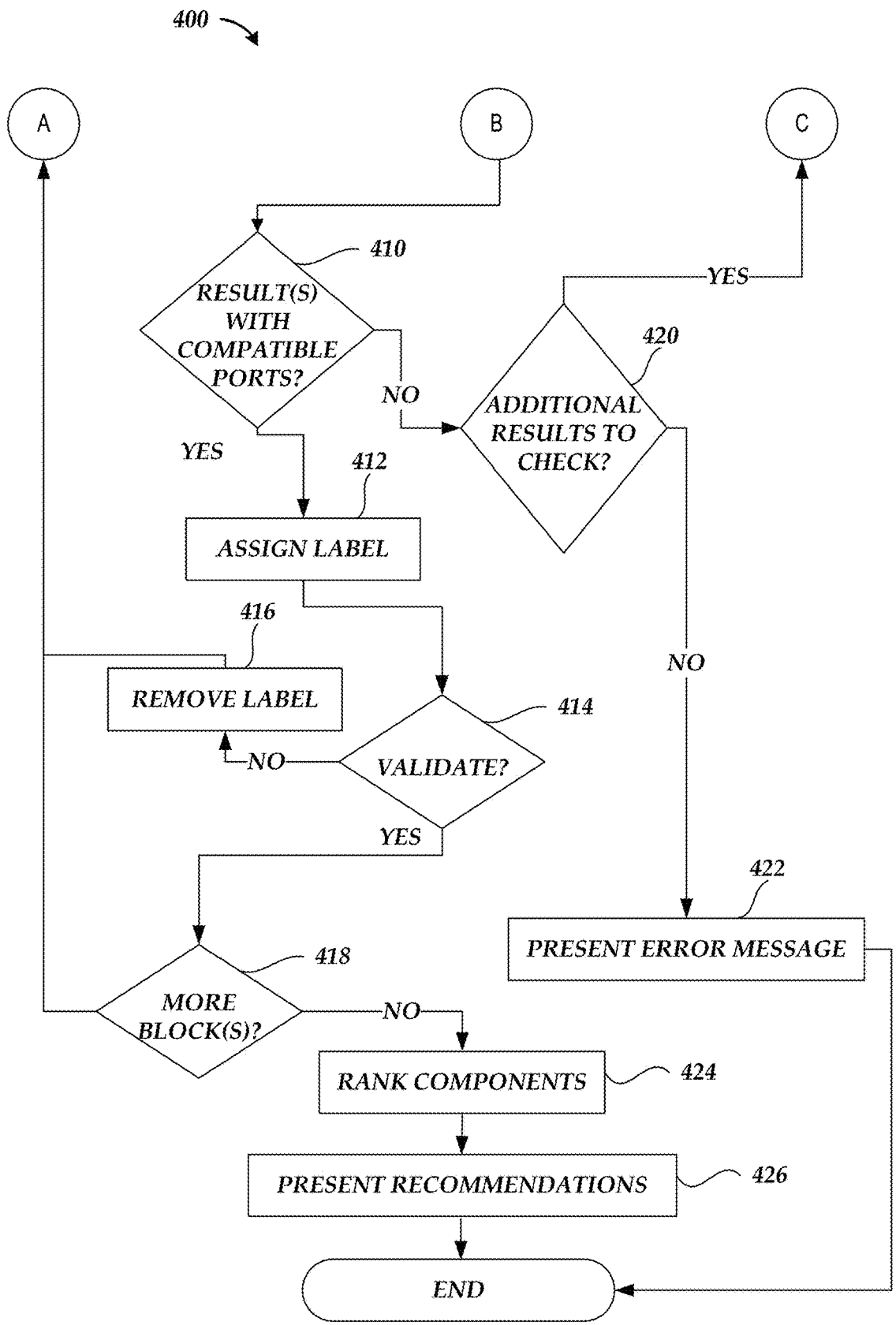

FIGS. 4A-4B are flow diagrams depicting a method 400 implemented by the engineering system 104 for automated electronics design, among other things. As described herein, the engineering system 104 may include the resolver server 110. In some embodiments, the resolver server 110 may implement a resolver service that implements aspects of the method 400. Some aspects of the method 400 may be implemented by other components of the engineering system 104, such as the user interface server 120.

In FIG. 4A, beginning at block 402, input requirements can be received. The user interface server 120 and/or the API server 132 can initially receive at least some of the input requirements. The input requirements can include the blocks of an electronics system design (such as a microcontroller block, an LED block, a supply block, etc.) and connections between the blocks. The input requirements can include a connection topology and/or a port direction. The input requirements can include specification(s) for the blocks, such as, but not limited to, a port attribute, a particular voltage level, a maximum operating temperature, a maximum clock frequency, a memory size, etc. A specification can include an attribute, an operator, and an attribute value. Some input requirements can include a selection of a port type for a connection. Additional details regarding receiving input requirements are described herein, such as with respect to, but not limited to, FIGS. 2A-2D, 2F-2I, 2K, 2M. The resolver server 110 can further receive the input requirements 300.

At block 404, a database can be queried. The resolver server 110 can generate one or more query parameters based on the input requirements, which can include the blocks. The hardware components database can include representations of hardware components, such as, but not limited to, microcontrollers (MCUs), power supplies, sensors, LEDs, etc. In some embodiments, each category type of a block can have its own table in the hardware components database. The resolver server 110 can convert a specification for the first block to a first query parameter, wherein the specification comprises an attribute and attribute value. Additional details regarding specifications are described herein, such as with respect to FIG. 2I. In some embodiments, the resolver server 110 can query a hardware components database multiple times, such as once per block in the input requirements. The resolver server 110 can query the hardware components database based on the category type of each block and any specifications for each block. The resolver server 110 can receive, from the hardware components database, results responsive to the query parameters, where each result can be associated with a hardware component.

At block 406, the initial query results can be ranked. The resolver server 110 can rank (such as by sorting) the hardware components based on criteria, such as, but not limited to, cost, quality (which can be defined by the user), area, component availability, or any other factor.

At block 408, a set of results can be selected that satisfy connection requirements. The resolver server 110 can identify, from the results, a subset of hardware components with a compatible port for a connection between two or more blocks. The resolver server 110 can apply additional one or more requirements when determining compatibility, such as, but not limited to, a port attribute, a port direction, a connection topology, etc. As described herein, the resolver server 110 can apply a port compatibility map to determine whether there are compatible ports. In some embodiments, the resolver server 110 can determine, from the initial results, a ranking of results with a category type compatible with a category type of a block from the input requirements. The resolver server 110 can select, from the results, a set of results under a threshold number based on the ranking. As described herein, using a reduced number of results under a threshold number can advantageously reduce the number of permutations that the resolver server 110 checks, which can speed up the resolving process. In some embodiments, a threshold number can be twenty, thirty, forty, or fifty different hardware components for a block. In some embodiments, a different threshold number can be used and/or the number can be configurable. Additional details regarding selecting results that satisfy connection requirements are described herein, such as with respect to FIGS. 3A-3C.

As described herein, the engineering system 104 can allow high-level connections between blocks, which can be a connection where a user has not specified one or more port types for the connection. From the available hardware component results, the resolver server 110 can determine port(s) that are available between the connected hardware components in accordance with the connection between respective blocks. The resolver server 110 can determine, from the results, a first set of results with a first category type compatible with a category type of a first block. The resolver server 110 can determine, from the results, a second set of results with a second category type compatible with a category type of a second block. The resolver server 110 can identify a compatible port between at least one hardware component from the first set and one hardware component from the second set. The resolver server 110 can identify a compatible port according to a port compatibility map. The port compatibility map can consider port type, port specifications, port directions, and port connection topologies (such as, but not limited to, point-to-point, bus, daisy chain, star, ring, and/or mesh). Common port types can be compatible as well as different port types based on the port compatibility map. Thus, the resolver server 110 can assign a compatible port to the first connection between the first block and the second block.

In some embodiments, the port compatibility map can be a data structure. The port compatibility map can indicate which port types can be compatible with other port types. For example, a digital pin can be connected to an analog pin/a clock can be connected to a digital pin in some electronic systems, which can be defined by the port compatibility map. The port compatibility map can also indicate compatible port attributes, such as, but not limited to, port direction and port connection topologies. For example, the port compatibility map can indicate that two input ports or two output ports may not be connected together. The port compatibility map can include a hierarchical component. A clock port type can also be compatible with a digital signal, which, proceeding up the hierarchy, can also be compatible with an analog signal. Accordingly, the clock port type can act as a digital port type and an analog port type. The hierarchical information in the port compatibility map can act in a similar manner as inheritance in object-oriented programming. Given a user specification that a port type be a digital port type or an analog port type, then, consulting the compatibility port map, the resolver server 110 can match a clock port type with the digital port type or the analog port type since those port types can be indicated as compatible. However, if the user specification indicates a clock port type, which can be a specialized port type, then, consulting the compatibility port map, the resolver server 110 can exclusively match the clock port type with another clock port type since the specialized port type may not be compatible with a more generic port type. Port directionality can also be included into the port compatibility map. For a digital port type in the port compatibility map, the digital port type can have a data flow direction, such as an input and output of the signal from a digital port type. In another example, the port type can be a power supply port type that can provide power to one or more electrical components, which has a directionality that can be indicated in the port compatibility map. The port compatibility map can also indicate port connection topologies. For example, some port types can be configured as an SPI topology where components must be connected to a bus, which can be indicated in the port compatibility map. Accordingly, the resolver server 110 can avoid matching a hardware component with a port exclusively associated with an SPI topology and a different hardware component with another port exclusively associated with a daisy chain topology, where the two different topologies may be incompatible. The resolver server 110 can thus determine port compatibility with the port compatibility map.

In some embodiments, if a subset of results has the same category type and the same port types, that set can be treated as a set of one for the duration of the resolving process by the resolver server 110. Treating a set of multiple hardware components as a set of one can advantageously speed up the resolving process by using less computational resources and reducing the number of permutations that the resolver server 110 may check. As described herein, port types can have hierarchical relationships, such as a "GPIO" port type being compatible with multiple other port types. Thus, the resolver server 110, during the resolving process, can allow matching port types that do not necessarily have the same string names.

In FIG. 4B, at block 410, it can be determined whether there are any results with compatible ports. The resolver server 110 can determine, from among the query results, whether there are sets of hardware components with compatible ports in accordance with the connections of corresponding blocks. Additional details regarding compatible ports are described herein, such as with respect to FIGS. 3A-3C. If the resolver server 110 determines that the current set of results do not have a compatible port for the connection and respective blocks of the connection, then the method 400 proceeds to block 420 to determine if there are additional results to check. If there are results with a compatible port, then the method 400 proceeds to block 412 to assign a label.

At block 420, it can be determined whether there are additional results to check. The resolver server 110 can determine that there are additional results to check, such as if the total number of query results exceed the threshold number. If the total number of query results exceed the threshold number, then the method 400 returns to block 408 to select a new set of results for additional processing. The resolver server 110 can select, from the results, another set of results different from the current set and with a category type compatible with the category type of the block being processed. The resolver server 110 can determine that a hardware component from the second set of results has a compatible port for the block and connection being processed and can include the hardware component from the second set. If there are no additional results to check, then the method 400 proceeds to block 422 to present an error message.

At block 422, an error message can be presented based on the type of error. The resolver server 110 can identify a different type of error based on the results of the one or more searches. In some cases, the resolver server 110 can determine that a hardware component does not exist in the results of hardware components with a category type of a block and compatible with a specification. In such a case, the user interface server 120 can present, in the graphical user interface, an indicator of an error associated with the block.

In some cases, such as where a user has provided a port type for a connection and a block has two or more ports of the selected port type, the resolver server 110 can determine that a hardware component does not exist in the results of hardware components with a category type of the block and with at least a compatible port. In such a case, the user interface server 120 can present, in the graphical user interface, an indicator of an error associated with the connection.

At block 412, a port can be assigned an unavailability label. The resolver server 110 can assign an unavailability label to a port from the pool of ports and proceed back to block 408 for additional processing. The resolver server 110 can assign unavailability labels to compatible ports for each hardware component from the subset of hardware components. The resolver server 110 can assign the label to the previously identified ports from the pool of ports and can begin processing a subsequent connection associated with one or more additional blocks. The resolver server 110 may determine that the subsequent connection with a specific port type and some hardware components from the results are feasible since each of the foregoing components have compatible port types available for use. Additional details regarding assigning unavailability labels to ports are described herein, such as with respect to FIGS. 3A-3C.

At block 414, whether a hardware component has compatible signals and nets for the electronics system design can be validated. The resolver server 110 can validate compatible signals and nets using a mapping of nets to signals and applying a port allocation algorithm. A mapping of signals to nets is described herein, such as with respect to FIG. 3C. As described herein, the mapping can indicate that for a "uart1" port the "TX" signal is compatible with the "A3" and "A4" nets and the "RX" signal is compatible with the "A3" and "A5" nets. The mapping can be user-defined or defined by other requirements received by the engineering system 104. The resolver server 110 can determine a mapping of signals to nets for the hardware component. The resolver server 110 can determine, from the mapping of signals to nets, a set pairing for the signals to nets compatible with the connection and two or more blocks. The set pairing can be valid pairs of signals to nets based on the mapping. The resolver server 110 can validate the hardware component with the following conditions: (1) a signal is allocated to a net; and (2) a net is not mapped to more than one signal. If the signals to nets for the hardware component are validated, then the method 400 can proceed to block 418 to determine whether there are additional blocks to process. In some cases, the resolver server 110 determines, from the mapping, that a set pairing does not exist for the signals to the nets that are compatible with the connection and two or more blocks. If the signals to nets for the hardware component are unable to be validated, then the method 400 can proceed to block 416 to remove an assigned unavailability label to an associated port.

The resolver server 110 can convert the mapping for the hardware component into a graph representation. The graph representation can be a bipartite graph representation where each vertex (which can also be referred to as a node) in the representation belongs to one of the signal set of vertices or net set of vertices. A graph representation is described in further detail herein, such as with respect to FIG. 3C. The resolver server 110 can apply a greedy algorithm to the graph representation. The greedy algorithm can be a Ford-Fulkerson algorithm. In some embodiments, the resolver server 110 can apply the Edmonds-Karp algorithm, which can be a modified form of the Ford-Fulkerson algorithm that uses a breadth-first search (BFS) instead of a depth-first search (DFS). The greedy algorithm can determine a maximum number of edges between the two sets, which can also be referred to as a maximum flow of the graph representation and/or maximum bipartite matching. The resolver server 110 can determine a maximum flow between the signals and the nets for the ports in the electronics system design associated with the hardware component, where each edge has a capacity of one.

In some embodiments, the greedy algorithm can use an adjacency matrix, adjMatrix[ ][ ], with nets represented by rows and signals represented by columns. If a net "x" is compatible with signals "a," "b," and "c," then adjMatrix[x][a]=1, adjMatrix[x][b]=1, and adjMatrix[x][c]=1, otherwise it is 0. The algorithm can include keeping track of signals allotted to nets by using an assign[ ] array. For example, assign[1]=2 indicates that net number 2 (such as "A2") is assigned to signal number 1 (such as "VCC+"). Each net can be associated with a visited[ ] array to keep track of the signals that have already been tried (to prevent the algorithm from repeating in loops). The algorithm can conduct a path-finding search, such as a BFS for an Edmonds-Karp approach or a DFS for a Ford-Fulkerson approach, for each net to find compatible signals. The algorithm can iterate through all of the signals. The algorithm can check if the net is compatible with the signal and has never been considered for it (adjMatrix[net][signal], 1 && visited[signal]==false), if so, the algorithm marks visited[signal]=true (net considered for this signal and will not be considered again). If no other nets are allocated to the signal (assign[signal]==−1), then the algorithm can assign the signal to this net. If the main algorithm finds the signal assigned earlier to another net, such as "x," then algorithm can make a recursive call for net "x" (and perform another path-finding search) to see if the algorithm can assign another signal to net "x." If this occurs, then the algorithm can assign the signal to the current net, break out of the current loop, and look for the next net. If the algorithm cannot assign the signal to this net, then the algorithm can look for the next available signal.

At block 416, an unavailability label can be removed for the port. The resolver server 110 can remove the unavailability label for the current port at a second time (which was previously assigned to the port at an earlier first time). As described herein, the method 400 can automatically resolve hardware components and ports for an electronics system design, which can be referred to as exploring a search tree of hardware components and ports. By removing an unavailability label for a port, the method 400 can explore other branches of the search tree of hardware components and ports. Accordingly, the resolver server 110 can resolve the blocks and connections in the electronics system design trying different permutations of hardware components and/or ports. The method 400 proceeds to block 408 to select a set of results for additional processing.

At block 418, it can be determined whether there are additional blocks to process. The resolver server 110 can proceed through the input requirements and check for additional blocks that have not already been resolved to one or more hardware components. If there are additional blocks, then the method can proceed to block 408 to select a new set of results for additional processing. If there are no additional blocks for processing, then the method can proceed to block 416 for ranking hardware components.

At block 424, since no other blocks are available for processing, the selected hardware components can be ranked. As described herein, the resolver server 110 can rank (such as by sorting) the selected hardware components based on criteria, such as, but not limited to, cost, quality (which can be defined by the user), area, component availability, or any other factor. The resolver server 110 can select a hardware component for each block with a highest ranking from the feasible hardware components. The resolver server 110 can select multiple hardware components for each block to present to a user, such as the top ten hardware components with the highest rankings. At block 426, the recommendations can be presented. The user interface server 120 can present a visual indicator for each block that has a selected hardware component. The user interface server 120 can present a visual indicator that a compatible port has been assigned to a connection between blocks. In some embodiments, the user interface server 120 can present multiple feasible hardware components, which can be available for selection by a user.

Figure 5:
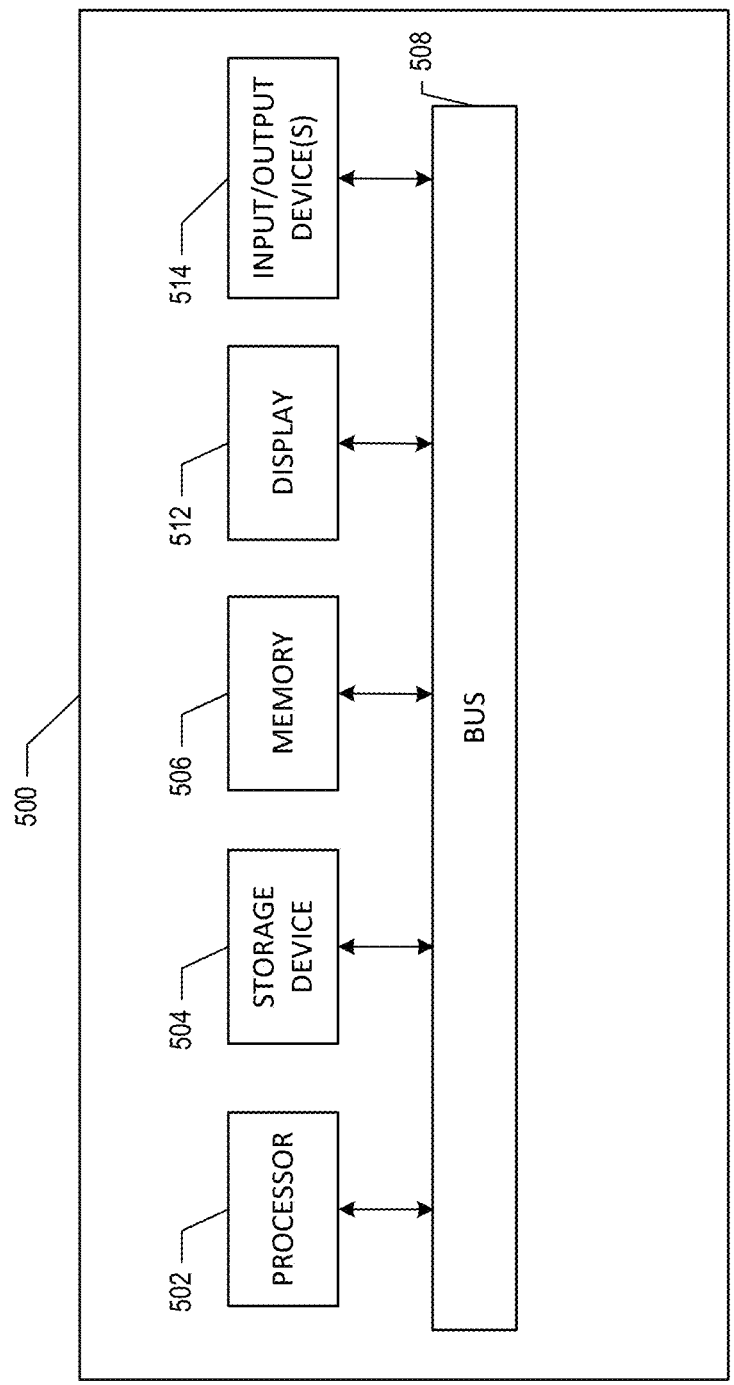
FIG. 5 is a block diagram illustrating an example computing system with which various methods and systems discussed herein may be implemented.

FIG. 5 is a block diagram that illustrates example components of a computing device 500. The computing device 500 can implement aspects of the present disclosure. With respect to FIG. 1, the resolver server 110 or the user interface server 120 of FIG. 1 can be implemented in a similar manner as the computing device 500. The computing device 500 can communicate with other computing devices.

The computing device 500 can include a hardware processor 502, a data storage device 504, a memory device 506, a bus 508, a display 512, and one or more input/output devices 514. The hardware processor 502 can also be implemented as a combination of computing devices, e.g., a combination of a digital signal processor and a microprocessor, a plurality of microprocessors, one or more microprocessors in conjunction with a digital signal processor, or any other such configuration. The hardware processor 502 can be configured, among other things, to execute instructions to perform one or more functions. The data storage device 504 can include a magnetic disk, optical disk, solid state drive, or flash drive, etc., and is provided and coupled to the bus 508 for storing information and instructions. The memory device 506 can include one or more memory devices that store data, such as, without limitation, random access memory (RAM) and read-only memory (ROM). The computing device 500 may be coupled via the bus 508 to the display 512, such as an LCD display or touch screen, for displaying information to a user, such as an engineer. The computing device 500 may be coupled via the bus 508 to one or more input/output devices 514. The input device 514 can include, but is not limited to, a keyboard, mouse, digital pen, microphone, or touch screen.

A resolver application may be stored on the memory device 506 and executed as a service by the hardware processor 502. In some embodiments, the resolver application may implement various aspects of the present disclosure. The resolver application can automatically resolve hardware components for an electronics system design.

While some embodiments discuss a drag and drop feature, additional or alternative embodiments may support other user interface interactions. In some embodiments, a user can design at least a portion of an electronic hardware system with a user interface without using a drag and drop feature. The user interfaces described herein may support receiving input via keyboard-only access (such as a command-line interface) and/or voice input.

It is to be understood that not necessarily all objects or advantages may be achieved in accordance with any particular embodiment described herein. Certain embodiments may be configured to operate in a manner that achieves or optimizes one advantage or group of advantages as taught herein without necessarily achieving other objects or advantages as may be taught or suggested herein.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a graphics processing unit (GPU), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language used herein, such as, among others, "can," "might," "may," "e.g.," "for example," and the like, unless specifically stated otherwise, or otherwise understood within the context as used, is generally intended to convey that certain embodiments include, while other embodiments do not include, certain features, elements, or states. Thus, such conditional language is not generally intended to imply that features, elements or states are in any way required for one or more embodiments.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Such disjunctive language is not generally intended to, and should not, imply that certain embodiments require at least one of X, at least one of Y, and at least one of Z to each be present. Thus, the term "or" is used in its inclusive sense (and not in its exclusive sense) so that when used, for example, to connect a list of elements, the term "or" means one, some, or all of the elements in the list.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The terms "comprising," "including," "having," and the like are synonymous and are used inclusively, in an open-ended fashion, and do not exclude additional elements, features, acts, operations, and so forth.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others.

What is claimed is:

1. A computer-implemented method for automated electronics design, the computer-implemented method comprising:
   under control of a computer hardware processor configured with computer executable instructions,
       receiving a first block, a second block, a first connection, and a second connection, wherein the first connection connects the first block and the second block, wherein the second connection connects to at least one of the first block and the second block;
       determining query parameters based on the first block and the second block;
       querying a database with the query parameters;
       receiving, from the database, a plurality of results responsive to the query parameters, wherein each result of the plurality of results is associated with a hardware component;
       identifying, from the plurality of results, a first subset of hardware components with a first compatible port for the first connection, the first block, and the second block;
       assigning, at a first time, an unavailability label to a first compatible port for each hardware component from the first subset of hardware components;
       identifying, from the first subset, a second subset of hardware components with a second compatible port for the second connection and at least one of the first block and the second block;
       determining a ranking for the second subset of hardware components;
       selecting, from the second subset, a first hardware component and a second hardware component based on the ranking;
       determining a mapping of a plurality of nets to a plurality of signals for the first hardware component;
       determining, from the mapping of the plurality of nets to the plurality of signals, that a set pairing does not exist for the plurality of nets to the plurality of signals compatible with the first connection, the first block, and the second block;
       removing the unavailability label for the first compatible port at a second time; and
       resolving the first block, the second block, the first connection, and the second connection after the second time.

2. The computer-implemented method of claim 1, wherein identifying the first subset of hardware components further comprises:
   determining, from the plurality of results, a first ranking of results with a first category type compatible with a category type of the first block; and
   selecting, from the plurality of results, a first set of results under a threshold number of results based on the ranking.

3. The computer-implemented method of claim 2, wherein identifying the first subset of hardware components further comprises:
   determining that the first set of results do not have the first compatible port for the first connection, the first block, and the second block;
   selecting, from the plurality of results, a second set of results different from the first set and with a second category type compatible with the category type of the first block;
   determining that a hardware component from the second set of results has the first compatible port for the first connection, the first block, and the second block; and
   including, in the first subset of hardware components, the hardware component from the second set.

4. The computer-implemented method of claim 1, wherein determining the query parameters based on the first block further comprises:
   converting a specification for the first block to a first query parameter, wherein the specification comprises an attribute and attribute value; and
   adding the first query parameter to the query parameters.

5. The computer-implemented method of claim 1, wherein determining the ranking for the second subset of hardware components further comprises:
   sorting, each hardware component from the second subset of hardware components, based on at least one of cost, quality, area, or component availability.

6. The computer-implemented method of claim 1, further comprising:
   determining a plurality of hardware components compatible with the first block based on the ranking, wherein the plurality of hardware components comprise the first hardware component; and
   presenting, in a graphical user interface, the plurality of hardware components.

7. A system comprising:
   a data storage medium comprising a database, wherein the database comprises a plurality of hardware components, wherein each hardware component of the plurality of hardware components comprises one or more ports; and one or more computer hardware processors in communication with the data storage medium, wherein the one or more computer hardware processors are configured to execute computer-executable instructions to at least:
receive a first block, a second block, a first connection, and a second connection, wherein the first connection connects the first block and the second block, wherein the second connection connects to at least one of the first block and the second block;
determine query parameters based on the first block and the second block;
query the database with the query parameters;
receive, from the database, a plurality of results responsive to the query parameters, wherein each result of the plurality of results is associated with a hardware component;
identify, from the plurality of results, a first subset of hardware components with a first compatible port for the first connection, the first block, and the second block;
assign, at a first time, an unavailability label to the first compatible port for each hardware component from the first subset of hardware components;
identify, from the first subset, a second subset of hardware components with a second compatible port for the second connection and at least one of the first block and the second block;
determine a ranking for the second subset of hardware components;
select, from the second subset, a first hardware component and a second hardware component based on the ranking;
determine a mapping of a plurality of nets to a plurality of signals for the first hardware component;
determine, from the mapping of the plurality of nets to the plurality of signals, that a set pairing does not exist for the plurality of nets to the plurality of signals compatible with the first connection, the first block, and the second block;
remove the unavailability label for the first compatible port at a second time; and
resolve the first block, the second block, the first connection, and the second connection after the second time.

8. The system of claim 7, wherein identifying the first subset of hardware components further comprises:
determining, from the plurality of results, a first ranking of results with a first category type compatible with a category type of the first block;
selecting, from the plurality of results, a first set of results under a threshold number of results based on the ranking;
determining that the first set of results do not have the first compatible port for the first connection, the first block, and the second block;
selecting, from the plurality of results, a second set of results different from the first set and with a second category type compatible with a first category type of the first block;
determining that a hardware component from the second set of results has the first compatible port for the first connection, the first block, and the second block; and
including, in the first subset of hardware components, the hardware component from the second set.

9. The system of claim 7, wherein the one or more computer hardware processors are configured to execute further computer-executable instructions to at least:
determine, from the plurality of results, a first set of results with a first category type compatible with a category type of the first block;
determine, from the plurality of results, a second set of results with a second category type compatible with a category type of the second block; and
identify the first compatible port between at least one hardware component from the first set and one hardware component from the second set according to a port compatibility map.

10. The system of claim 7, wherein the first connection does not have an assigned port type, wherein the one or more computer hardware processors are configured to execute further computer-executable instructions to at least:
determine, from the plurality of results, a first set of results with a first category type compatible with a category type of the first block;
determine, from the plurality of results, a second set of results with a second category type compatible with a category type of the second block; and
identify the first compatible port between at least one hardware component from the first set and one hardware component from the second set.

11. The system of claim 7, wherein the one or more computer hardware processors are configured to execute further computer-executable instructions to at least:
determine, from the mapping of the plurality of nets to the plurality of signals, a set pairing for the plurality of nets to the plurality of signals compatible with the first connection, the first block, and the second block.

12. The system of claim 11, wherein determining the set pairing further comprises:
applying an Edmonds-Karp algorithm to a graph representation of the mapping of the plurality of nets to the plurality of signals.

13. A system comprising:
a data storage medium; and
one or more computer hardware processors in communication with the data storage medium, wherein the one or more computer hardware processors are configured to execute computer-executable instructions to at least:
receive, via a graphical user interface, a selection of a first block, a second block, and a first connection between the first block and the second block;
determine a plurality of hardware components for the first block and the second block;
identify, from the plurality of hardware components, a first subset of hardware components with a first compatible port for the first connection, the first block, and the second block, the first subset of hardware components comprising a first hardware component;
assign, at a first time, an unavailability label to the first compatible port for each hardware component from the first subset of hardware components;
determine a mapping of a plurality of nets to a plurality of signals for the first hardware component;
determine, from the mapping of the plurality of nets to the plurality of signals, that a set pairing does not exist for the plurality of nets to the plurality of signals compatible with the first connection, the first block, and the second block;
remove the unavailability label for the first compatible port at a second time; and
resolve the first block, the second block, and the first connection after the second time.

14. The system of claim 13, wherein identifying the first subset of hardware components further comprises:
- determining a first set of results with a first category type compatible with a category type of the first block;
- determining a second set of results with a second category type compatible with a category type of the second block; and
- identifying the first compatible port and a second compatible port for a second connection between at least one hardware component from the first set and one hardware component from the second set according to a port compatibility map.

15. The system of claim 14, wherein a first port type of the first compatible port is different from a second port type of the second compatible port.

16. The system of claim 13, wherein determining the plurality of hardware components for the first block and the second block comprises:
- determining query parameters based on the first block and the second block;
- querying a database with the query parameters; and
- receiving, from the database, the plurality of hardware components responsive to the query parameters.

17. The system of claim 13, wherein the one or more computer hardware processors are configured to execute further computer-executable instructions to at least:
- determine, from the mapping of the plurality of nets to the plurality of signals, a set pairing for the plurality of nets to the plurality of signals compatible with the first connection, the first block, and the second block.

18. The system of claim 17, wherein determining the set pairing further comprises:
- applying a greedy algorithm to a graph representation of the mapping of the plurality of nets to the plurality of signals.

19. The system of claim 13, wherein the one or more computer hardware processors are configured to execute further computer-executable instructions to at least:
- receive, via the graphical user interface, a selection of a third block and a second connection between the first block and the third block;
- receive, via the graphical user interface, a specification for the third block;
- determine that a hardware component does not exist in the plurality of hardware components with a category type of the third block compatible with the specification; and
- present, in the graphical user interface, an indicator of an error associated with the third block.

* * * * *